US012726334B1

(12) United States Patent
Sekhar

(10) Patent No.: US 12,726,334 B1
(45) Date of Patent: Sep. 1, 2026

(54) METHOD AND SYSTEM FOR OUTSOURCING DECISION-TREE INFERENCE AND OBFUSCATING DECISION-TREE ATTRIBUTES

(71) Applicant: Pantherun Technologies Private Limited, Bangalore (IN)

(72) Inventor: Srinivas Lakshman Sekhar, Bangalore (IN)

(73) Assignee: Pantherun Technologies Private Limited, Bangalore (IN)

( * ) Notice: Subject to any disclaimer, the term of this patent is extended or adjusted under 35 U.S.C. 154(b) by 0 days.

(21) Appl. No.: 19/432,576

(22) Filed: Dec. 24, 2025

(30) Foreign Application Priority Data

Jun. 24, 2025 (IN) ............................ 202541060270

(51) Int. Cl.
*H04L 9/06* (2006.01)
*G06N 5/04* (2023.01)
*H04L 9/08* (2006.01)

(52) U.S. Cl.
CPC ............. *H04L 9/0631* (2013.01); *G06N 5/04* (2013.01); *H04L 9/0825* (2013.01); *H04L 9/088* (2013.01); *H04L 2209/046* (2013.01)

(58) Field of Classification Search
None
See application file for complete search history.

(56) References Cited

U.S. PATENT DOCUMENTS 12,574,205 B2 * 3/2026 Tueno ................. G06F 21/6245
2019/0190714 A1 * 6/2019 Joye ...................... G06F 18/285
2019/0258953 A1 * 8/2019 Lang ...................... G06N 3/006
2020/0161005 A1 * 5/2020 Lyman ............. G06Q 10/06315
2020/0272912 A1 * 8/2020 Chacko ................... G06F 9/547
2020/0311559 A1 * 10/2020 Chattopadhyay ........ G06N 5/01
2021/0019635 A1 * 1/2021 Wolf ...................... G06N 20/00
2021/0081807 A1 * 3/2021 Tueno .................... G06N 20/00
2021/0344478 A1 * 11/2021 Sarpatwar ................ G06N 5/04
2021/0376995 A1 * 12/2021 Ratha .................... H04L 9/0618
2021/0397988 A1 * 12/2021 Sarpatwar ............... H04L 9/008

(Continued)

OTHER PUBLICATIONS

Zheng et al. "Securely and Efficiently Outsourcing Decision Tree Inference", Jun. 2022, pp. 1841-1855. (Year: 2022).*

(Continued)

*Primary Examiner* — Kaveh Abrishamkar
(74) *Attorney, Agent, or Firm* — Barta Jones, PLLC

(57) ABSTRACT

A method and a system for outsourcing decision tree inference involving decision tree attribute obfuscation. Embodiments provide a privacy-preserving outsourced decision tree classification framework that incorporates an attribute-hiding mechanism to obfuscate attributes of nodes of a decision tree model, which is to be inferred for classification task based on a query data. Embodiments provide the framework that ensures robust protection of the attributes of the decision tree model, addresses transmission overhead issues associated with transmission of a share of the query data from the first device to the second device (by employing a seed-based pseudorandom generator for compressing the share of the query data), ensures enhanced privacy for users, and improves scalability for practical deployment in resource-constrained environments.

18 Claims, 7 Drawing Sheets

(56) References Cited

U.S. PATENT DOCUMENTS

2023/0006980 A1* 1/2023 Poorebrahim Gilkalaye .............. H04L 9/085
2025/0131339 A1* 4/2025 Anghel .................... G06N 5/04

OTHER PUBLICATIONS

Indian Patent Office, First Examination Report issued for Indian Application No. 202541060270 on Nov. 27, 2025, pp. 09.

* cited by examiner

METHOD AND SYSTEM FOR OUTSOURSING DECISION-TREE INFERENCE AND OBFUSCATING DECISION-TREE ATTRIBUTES

FIELD OF TECHNOLOGY

The present disclosure relates to outsourcing of inferencing of decision-tree classification models. Specifically, the present disclosure relates to a method and a system for securely outsourcing inference of a decision tree classification model and obfuscating attributes of the decision tree classification model during inference.

BACKGROUND

Decision tree classification is a fundamental machine learning technique that is widely used for performing classification and regression tasks. Its simplicity, interpretability, and effectiveness make it a popular choice across various domains, which include healthcare, finance, and Internet of Things (IoT) applications. However, with increasing adoption and proliferation of cloud computing and edge devices, there is a growing need to outsource computationally intensive tasks, such as decision tree inference, to external or cloud-based service provider devices. This is because edge devices, such as IoT sensors and mobile devices, often have limited computational and storage resources. These constraints make it impractical to perform complex decision tree inference locally on the edge devices.

Outsourcing computationally intensive tasks to the external or cloud-based service provider devices offers a viable solution, leveraging the service provider devices' computational power and storage capacity. This outsourcing, while efficient, introduces significant privacy concerns. For instance, data provided by users for classification often contains sensitive information. For example, in healthcare applications, patient data, which is required to remain confidential to comply with privacy regulations, may be provided to service provider devices. Furthermore, a decision tree model itself is a valuable intellectual property of a model owner. Exposing the decision tree model to unauthorized parties (such as the external cloud service providers during the outsourcing process risks its misuse or replication. To address these concerns, privacy-preserving outsourced decision tree classification systems have been developed. These systems aim to ensure that both user data and the decision tree model remain confidential throughout the inference process.

Existing or current privacy-preserving outsourced decision tree classification systems leverage secret sharing method and pseudorandom generators to provide a secure framework for outsourcing decision tree inference. While such systems demonstrate efficiency and security, they have certain critical bottlenecks. These include transmission overhead and attribute leakage. The transmission overhead may be indicative of an overhead involved in transmitting shares of a query data to a service provider device to which inference is outsourced. The size of the overhead is proportional to a number of attributes in the query data, resulting in significant communication costs for large datasets. The overhead limits scalability or practicality of implementing the current privacy-preserving outsourced decision tree classification systems, particularly in resource-constrained environments. The attribute leakage takes place due to deficiencies in framework design. In general, the design causes attributes in decision tree nodes to be stored in an unprotected format. Such unprotected (unencrypted) storage can expose the structure of the decision tree model to both the service provider devices and user devices. As a result, unauthorized parties can infer sensitive information about the decision tree model, such as the attributes used for classification and their thresholds. This leakage compromises the proprietary nature of the model and may allow adversaries to replicate its functionality.

Therefore, in light of the foregoing discussion, there exists a need to overcome the aforementioned drawbacks associated with the privacy-preserving outsourced decision tree classification frameworks.

SUMMARY

The present disclosure provides devices, a method, and a system for outsourcing decision tree inference and obfuscating decision tree attributes during decision tree inference. The present disclosure aims to address limitations and challenges in existing privacy-preserving machine learning systems by introducing enhanced privacy-preserving mechanisms for outsourced decision tree classification. The disclosure provides a privacy-preserving framework for an outsourced decision tree classification system that is both efficient and secure. The system protects a proprietary nature of a decision tree model and prevents unauthorized inferencing of the decision tree model by obfuscating attributes and structure of the decision tree model from both user devices (especially edge and Internet-of-Things (IoT) devices) and service provider devices (to which inferencing of the decision tree model is outsourced). The system, by leveraging lightweight cryptographic operations (such as additive secret sharing) and efficient designs, has a capability to provide attribute-hiding solutions that ensure that the attributes in the decision tree node remain confidential. This prevents attribute leakage and safeguards the proprietary nature of the decision tree model. In addition, the system may integrate the attribute-hiding solutions with transmission optimization techniques to ensure that the system is suitable for use in resource-constrained environments. The transmission optimization is achieved by transmitting a seed that enables computation of thresholds associated with decision tree nodes using a pseudo random generator. The system can handle large-scale datasets (query data) and complex decision tree models without compromising performance or security. The leveraging of lightweight cryptographic operations ensures that the system remains practical for real-world applications, including healthcare, Internet of Things (IoT), and cloud-based services.

In a first aspect, the present disclosure provides the first device that is configured to obtain a permuted query data from an original query data comprising a sequence of attribute values, wherein the sequence of attribute values is altered based on a permutation matrix to obtain the permuted query data. The first device is further configured to receive a secret key indicative of a first matrix from a third device, wherein the first matrix is an invertible matrix, and wherein a second device receives a public key, indicative of a second matrix, from the third device. The first device is further configured to receive a seed from the third device that enables computation of first shares of thresholds associated with non-leaf nodes of a first share of a permuted decision tree, wherein second shares of the thresholds and attributes associated with corresponding non-leaf nodes of a second share of the permuted decision tree are received by the second device from the third device. The first device is further configured to execute, iteratively, a set of steps for traversing the permuted decision tree until a leaf node is encountered. The set of steps comprises selection of a mask variable for generation of a masked query data from the permuted query data, wherein the mask variable is a positive integer; encryption of the masked query data based on computation of a product of the first matrix and the masked query data; transmission of the encrypted masked query data to the second device, wherein a fully permuted query data is generated by the second device based on the second matrix and the encrypted masked query data; reception, from the second device, of an outcome of a secure comparison operation performed based on an element of the fully permuted query data, a masked version of a first share of a threshold associated with a non-leaf node of the first share of the permuted decision tree, and a second share of the threshold associated with a corresponding non-leaf node of the second share of the permuted decision tree, wherein, at a first iteration, the non-leaf node is a root node of the first share of the permuted decision tree and the corresponding non-leaf node is a root node of the second share of the permuted decision tree; and selection of a first child node of the non-leaf node based on the outcome of the secure comparison operation, wherein a second child node of the corresponding non-leaf node is selected based on the outcome of the secure comparison operation, wherein, at a subsequent iteration, the first child node is the non-leaf node of the first share of the permuted decision tree and the second child node is the corresponding non-leaf node of the second share of the permuted decision tree, wherein the first child node is a first leaf node of the first share of the permuted decision tree at a final iteration, and wherein the second child node is a corresponding second leaf node of the second share of the permuted decision tree at the final iteration. The first device is further configured to generate a first share of a classification result based on a label associated with the first leaf node. The first device is further configured to receive, from the second device, a second share of the classification result generated based on a label associated with the corresponding second leaf node stored in the corresponding second leaf node. The first device is further configured to generate a decision tree classification result based on the first share of the classification result and the second share of the classification result.

In a second aspect, the present disclosure provides the second device that is configured to receive, from a third device, a public key indicative of a second matrix, wherein a first device receives a secret key indicative of a first matrix from the third device. The second device is further configured to receive second shares of the thresholds and attributes associated with corresponding non-leaf nodes of a second share of a permuted decision tree from the third device, wherein the first device computes first shares of thresholds associated with non-leaf nodes of a first share of the permuted decision tree using a seed received from the third device. The second device is further configured to execute, iteratively, a set of steps for traversing the permuted decision tree until a leaf node is encountered. The set of steps comprises reception of an encrypted masked query data from the first device, wherein a masked query data is encrypted by the first device to generate the encrypted masked query data, wherein the first device generates the masked query data from a permuted query data using a mask variable selected by the first device, wherein the mask variable is a positive integer, wherein the masked query data is generated based on an accumulation of the mask variable with each element of the permuted query data, wherein the first device generates the permuted query data from an original query data comprising a sequence of attribute values, and wherein the sequence of attribute values is altered based on a permutation matrix to generate the permuted query data; generation of a fully permuted query data based on the second matrix and the encrypted masked query data, wherein the fully permuted query data is generated based on computation of a product of the second matrix and the encrypted masked query data; reception, from the first device, of a masked version of a first share of a threshold associated with a non-leaf node of the first share of the permuted decision tree, wherein the masked version of a first share of a threshold associated with the non-leaf node is generated based on an accumulation of the selected mask variable and the first share of the threshold associated with the corresponding non-leaf node; performance of a secure comparison operation based on an element of the fully permuted query data, the masked version of the first share of the threshold associated with a non-leaf node of the first share of the permuted decision tree, and a second share of the threshold associated with a corresponding non-leaf node of the second share of the permuted decision tree, wherein the non-leaf node is a root node of the first share of the permuted decision tree and the corresponding non-leaf node is a root node of the second share of the permuted decision tree at a first iteration; selection of a second child node of the corresponding non-leaf node based on the outcome of the secure comparison operation, wherein the second child node is the corresponding non-leaf node of the second share of the permuted decision tree at a subsequent iteration, and wherein the second child node is a corresponding second leaf node of the second share of the permuted decision tree at a final iteration; and transmission of the outcome of the secure comparison operation to the first device, wherein the first device selects a first child node of the non-leaf node based on the outcome of the secure comparison operation, wherein the first child node is the non-leaf node of the first share of the permuted decision tree at the subsequent iteration, and wherein the first child node is a first leaf node of the first share of the permuted decision tree at the final iteration. The second device is further configured to transmit, to the first device, a second share of the classification result generated based on a label associated with the corresponding second leaf node, wherein the first device generates a first share of a classification result based on a label associated with the first leaf node, and wherein the first device generates a decision tree classification result based on the first share of the classification result and the second share of the classification result.

In a third aspect, the present disclosure provides the method for obtaining a decision-tree classification result. The method comprises obtaining a permuted query data from an original query data comprising a sequence of attribute values, wherein the sequence of attribute values is altered based on a permutation matrix to obtain the permuted query data. The method further comprises receiving a secret key indicative of a first matrix from a third device, wherein the first matrix is an invertible matrix, and wherein a second device receives a public key, indicative of a second matrix, from the third device. The method further comprises receiving a seed from the third device that enables computation of first shares of thresholds associated with non-leaf nodes of a first share of a permuted decision tree, wherein second shares of the thresholds and attributes associated with corresponding non-leaf nodes of a second share of the permuted decision tree are received by the second device from the third device. The method further comprises executing, iteratively, a set of steps for traversing the permuted decision tree until a leaf node is encountered. The set of steps comprises selecting a mask variable to generate a masked query data from the permuted query data, wherein the mask variable is a positive integer; encrypting the masked query data based on computation of a product of the first matrix and the masked query data; transmitting the encrypted masked query data to the second device, wherein a fully permuted query data is generated by the second device based on the second matrix and the encrypted masked query data; receiving, from the second device, an outcome of a secure comparison operation performed based on an element of the fully permuted query data, a masked version of a first share of a threshold associated with a non-leaf node of the first share of the permuted decision tree, and a second share of the threshold associated with a corresponding non-leaf node of the second share of the permuted decision tree, wherein, at a first iteration, the non-leaf node is a root node of the first share of the permuted decision tree and the corresponding non-leaf node is a root node of the second share of the permuted decision tree; and selecting a first child node of the non-leaf node based on the outcome of the secure comparison operation, wherein a second child node of the corresponding non-leaf node is selected based on the outcome of the secure comparison operation, wherein, at a subsequent iteration, the first child node is the non-leaf node of the first share of the permuted decision tree and the second child node is the corresponding non-leaf node of the second share of the permuted decision tree, wherein the first child node is a first leaf node of the first share of the permuted decision tree at a final iteration, and wherein the second child node is a corresponding second leaf node of the second share of the permuted decision tree at the final iteration. The method further comprises generating a first share of a classification result based on a label associated with the first leaf node. The method further comprises receiving, from the second device, a second share of the classification result generated based on a label associated with the corresponding second leaf node stored in the corresponding second leaf node. The method further comprises generating a decision tree classification result based on the first share of the classification result and the second share of the classification result.

In a fourth aspect, the present disclosure provides the system that comprises the first device, the second device, and the third device. The first device comprises a first processor, the second device comprises a second processor, and the third device comprises a third processor. The third device is configured to transmit an attribute sequence vector to the first device to enable the first device to generate a permuted query data. The third device is further configured to transmit a secret key indicative of a first matrix to the first device. The third device is further configured to transmit a public key indicative of a second matrix to the second device. The third device is further configured to obtain a permuted decision tree, wherein each non-leaf node of the permuted decision tree includes an attribute and a threshold. The third device is further configured to split the permuted decision tree into a first share of the permuted decision tree and a second share of the permuted decision tree. The third device is further configured to transmit a seed to the first device to enable the first device to compute first shares of thresholds associated with non-leaf nodes of a first share of the permuted decision tree and first shares of labels associated with leaf nodes of the first share of the permuted decision tree. The third device is further configured to transmit, to the second device, the second share of the permuted decision tree including second shares of the thresholds associated with corresponding non-leaf nodes of the second share of the permuted decision tree, first shares of labels associated with corresponding leaf nodes of the second share of the permuted decision tree, and attributes associated with the corresponding non-leaf nodes of the second share of the permuted decision tree.

It has to be noted that all devices, elements, processors, units, and modules described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not too scaled.

Wherever possible, like elements have been indicated by identical numbers.

Figure 1:
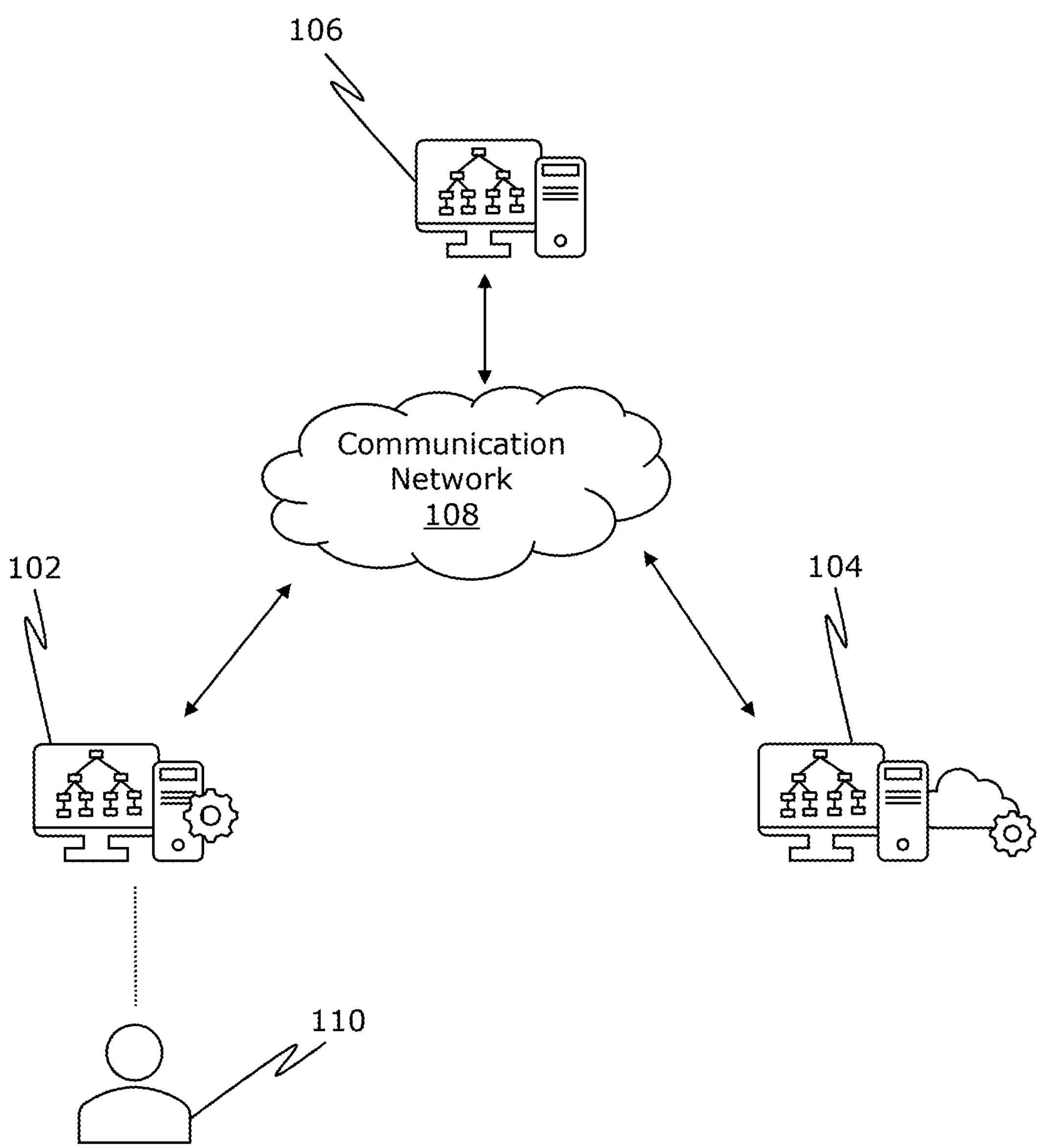
Figure 2:
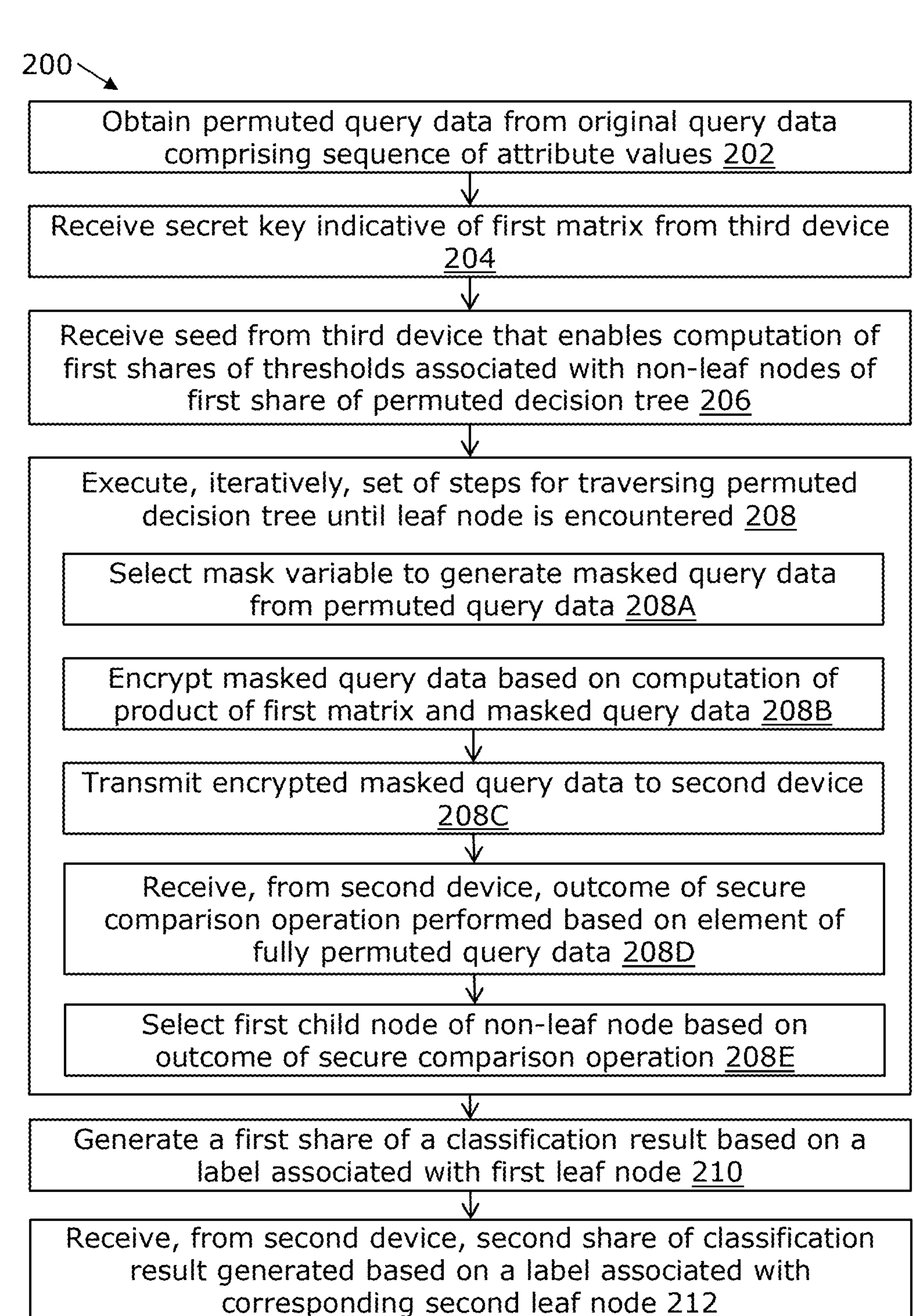
Figure 3:
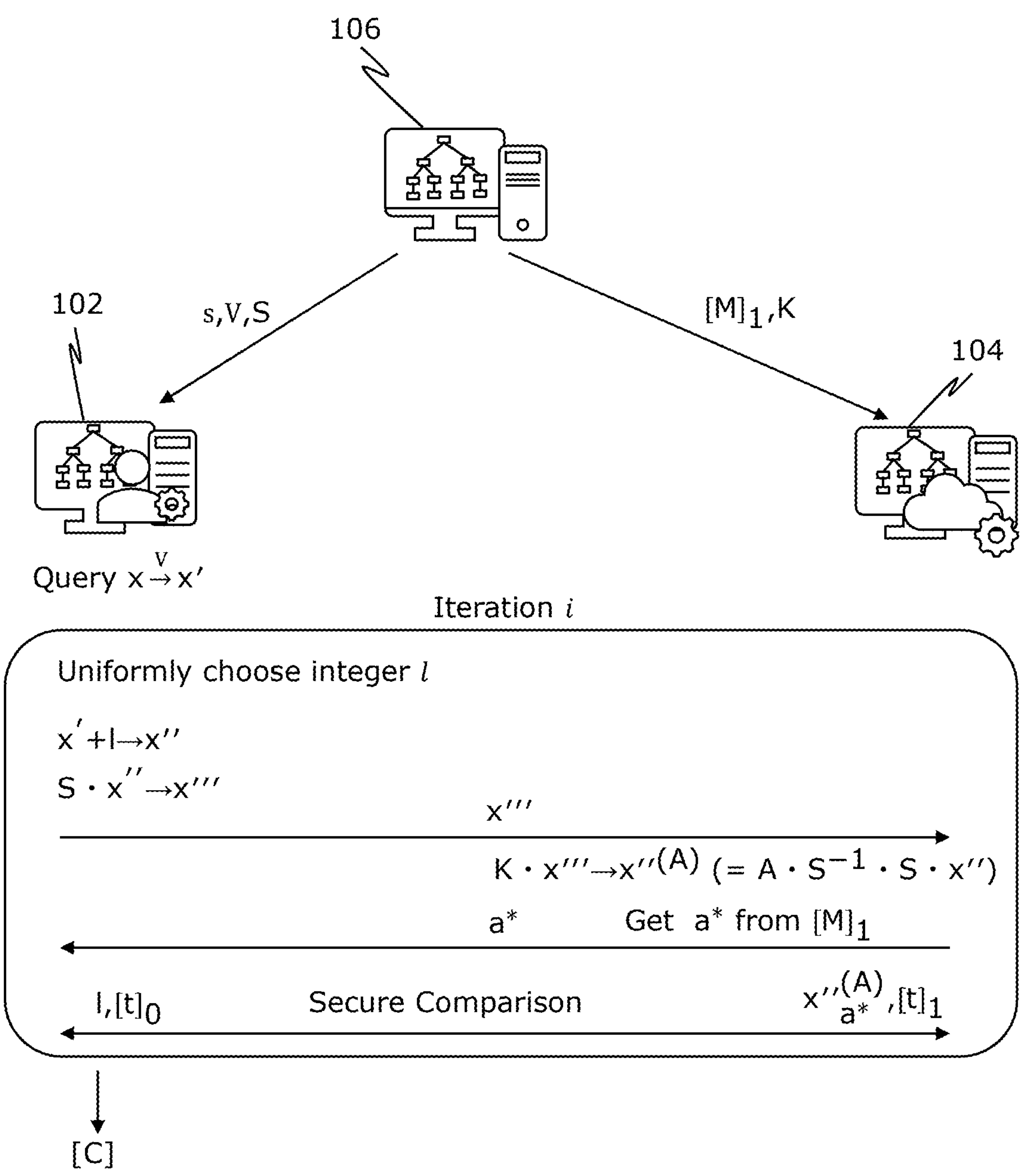
Figure 4A:
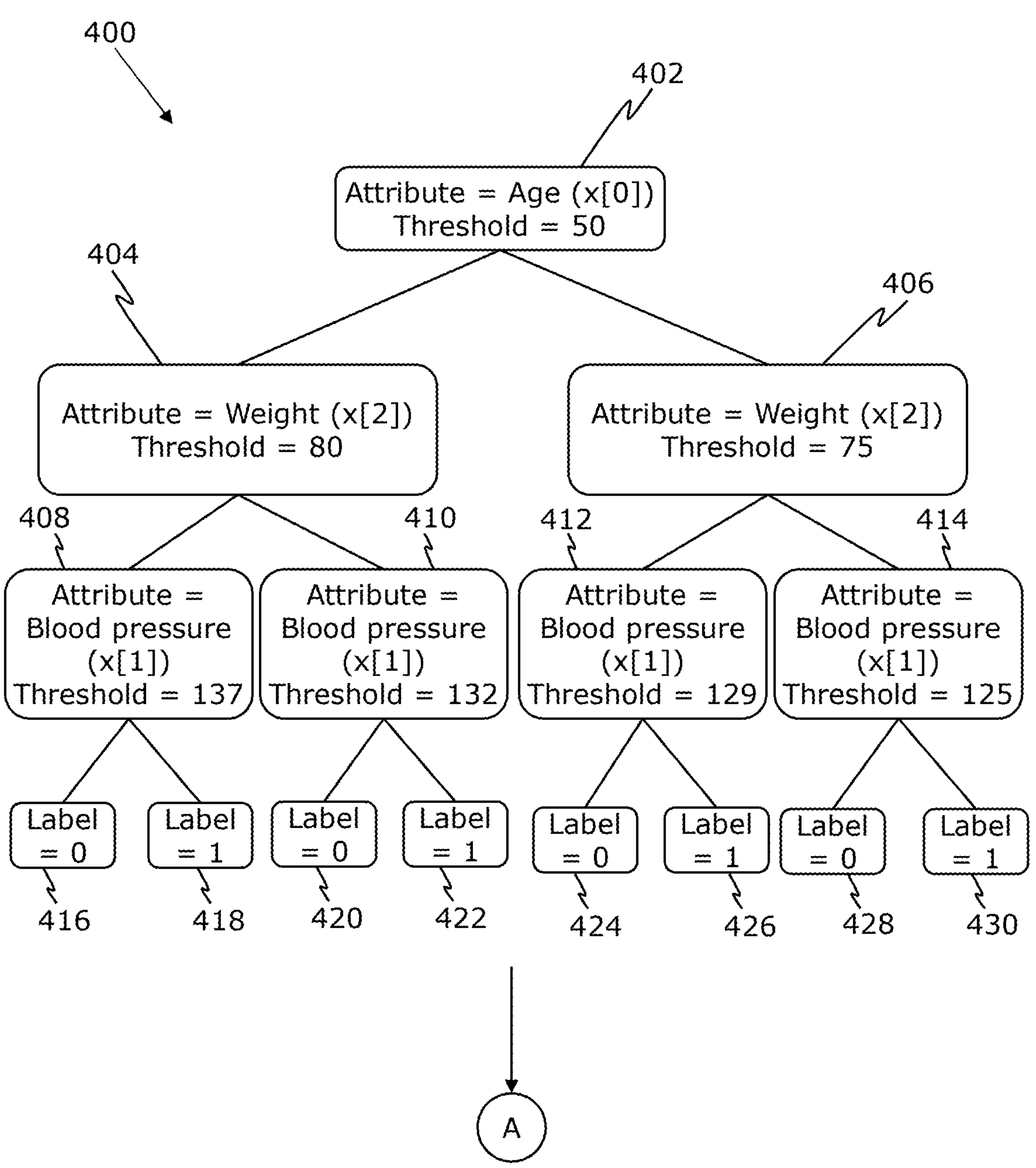
Figure 4B:
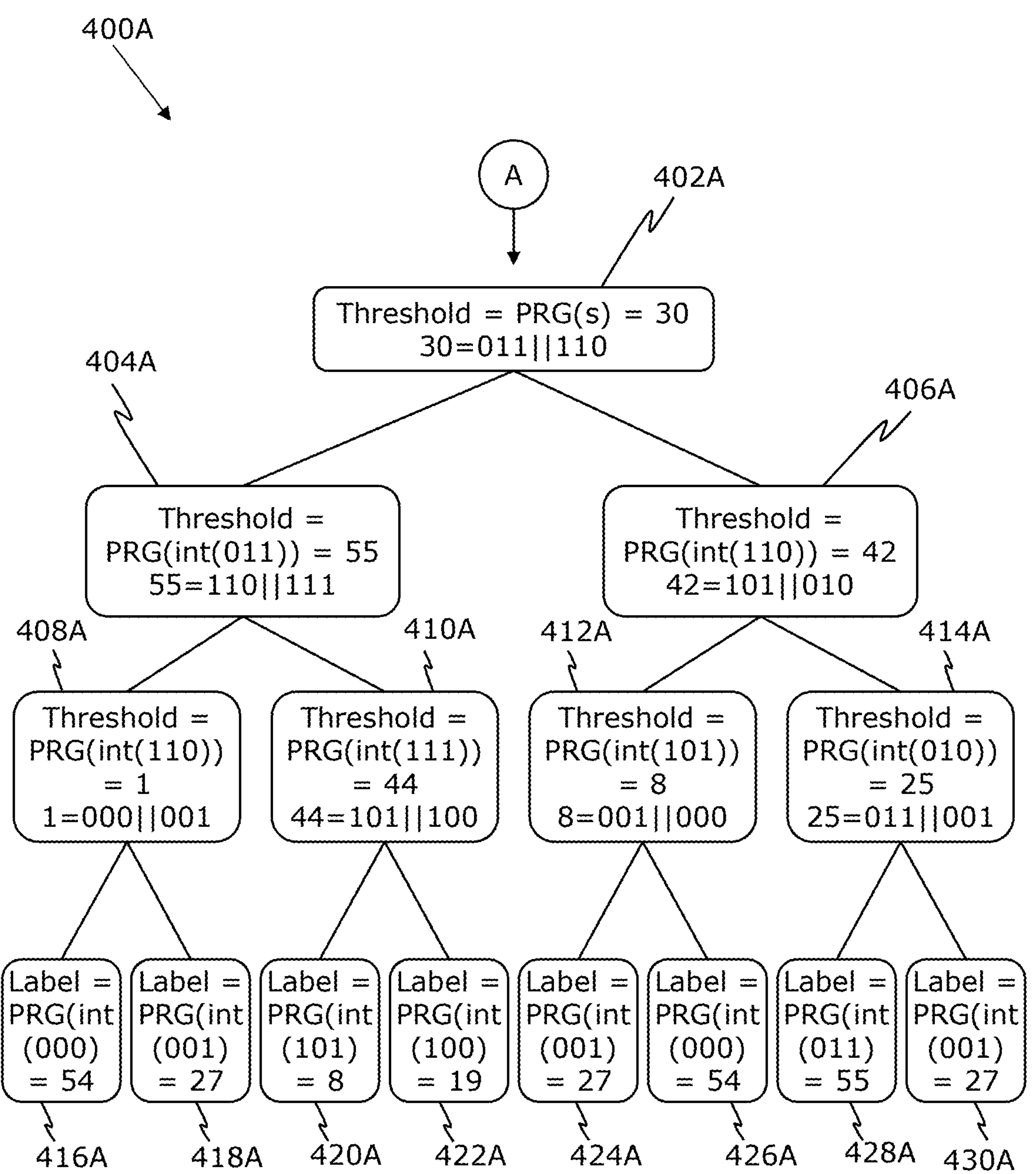
Figure 4C:
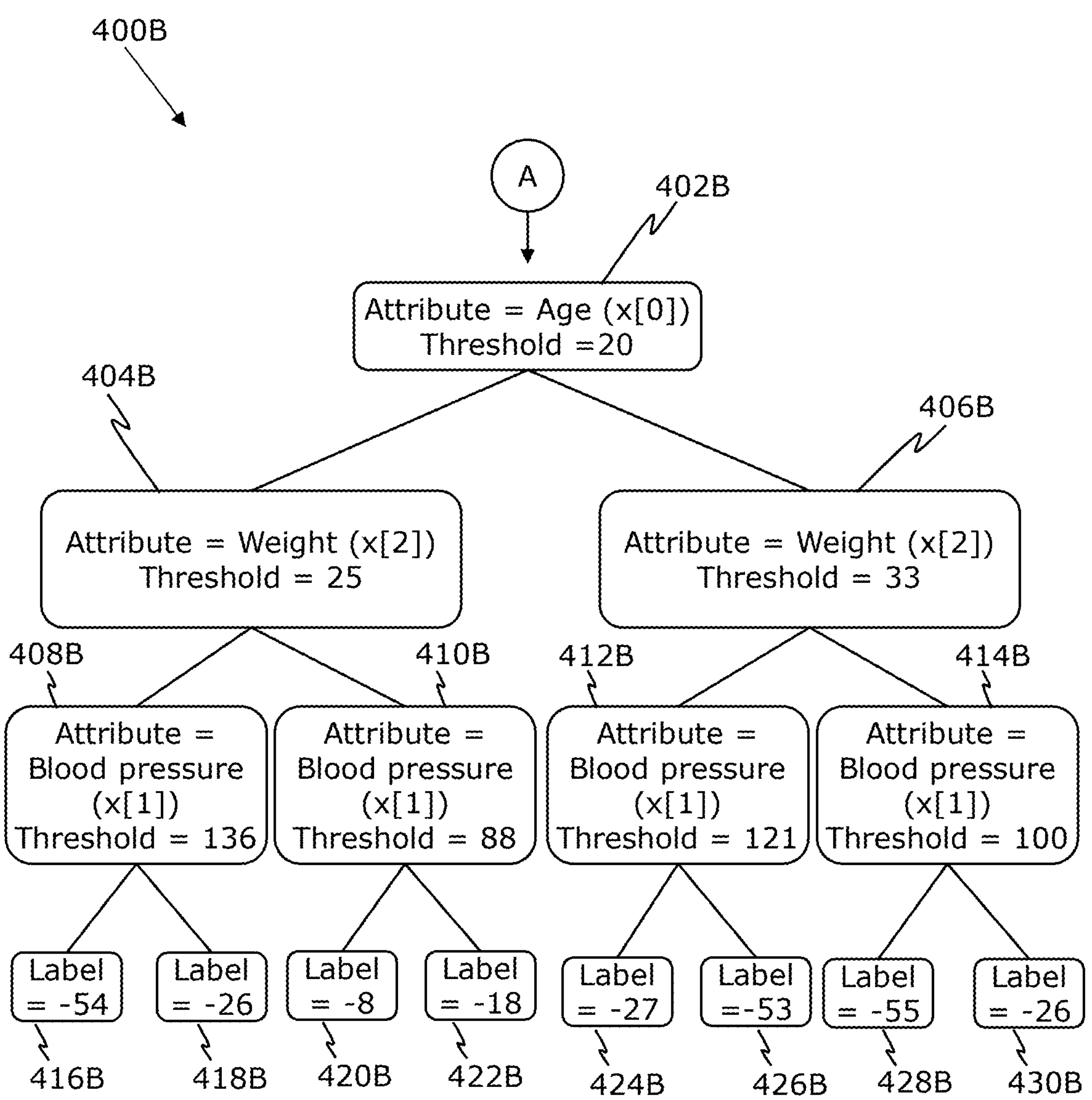
Figure 5A:
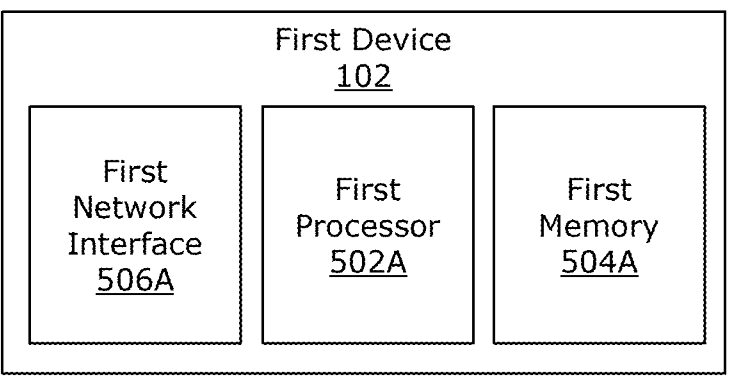
Figure 5B:
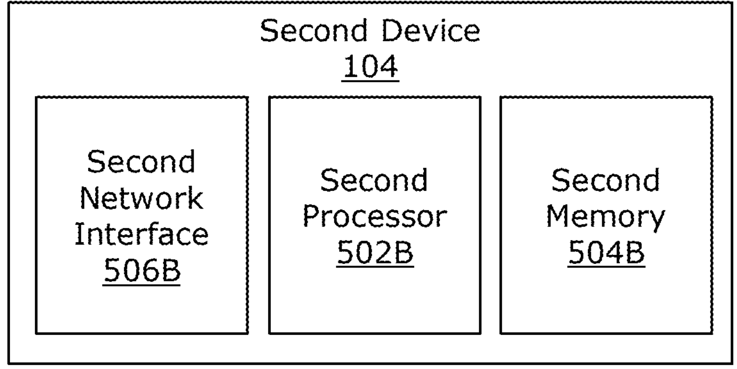
Figure 5C:
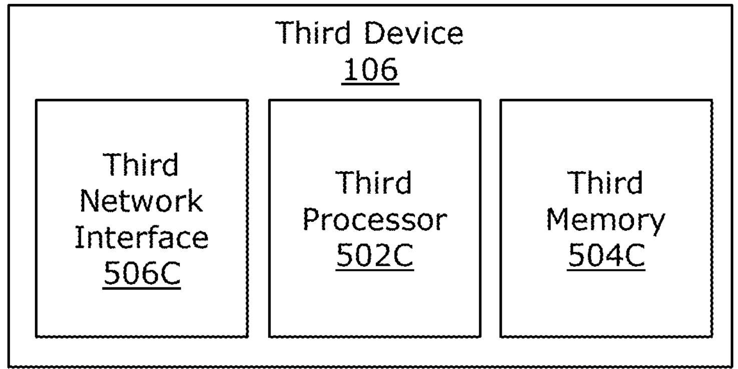

Embodiments of the present disclosure will now be described, by way of example, with reference to the following diagrams, wherein:

FIG. 1 illustrates an exemplary networking environment for implementing outsourcing of inference of a decision tree model and obfuscating attributes of the decision tree model during the inference, in accordance with an embodiment of the present disclosure;

FIG. 2 is a flowchart that illustrates steps of a method for outsourcing decision tree inference while obfuscating decision tree attributes during the inference, in accordance with an embodiment of the present disclosure;

FIG. 3 illustrates information exchange between entities of the networking environment for outsourcing inferencing of a decision tree classification model and obfuscating attributes of the decision tree classification model during inference, in accordance with an embodiment of the present disclosure;

FIGS. 4A-4C illustrate an exemplary permuted decision tree classification model and its shares, in accordance with an embodiment of the present disclosure; and FIG. 5A-5C are block diagrams illustrating components of the entities in the exemplary networking environment, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

FIG. 1 illustrates an exemplary networking environment 100 for implementing outsourcing of inference of a decision tree model and obfuscating attributes of the decision tree model during the inference, in accordance with an embodiment of the present disclosure. With reference to FIG. 1, there is shown the networking environment 100. The networking environment 100 includes a set of entities. The set of entities include a first device 102, a second device 104, and a third device 106. The first device 102, the second device 104, and the third device 106 may communicate with each other via a communication network 108. The third device 106 functions as a model owner as that owns a decision tree classification model. The first device 102 is a user device associated with a user 110. The first device 102 generates query data using which inference of the decision tree classification model is to be carried out. The first device 102 outsources inference of the decision tree classification model to the second device 104. The second device 104 functions as a service provider device that performs a majority of computations involved in inferencing the decision tree classification model, leading to generation of a decision tree classification result with respect to the query data.

The communication network 108 includes a medium (such as a communication channel) through which the set of entities (i.e., the first user device 102, the second user device 104, and the third user device 106) communicate with each other. The communication network 108 may be a wired/wireless network. Examples of the communication network 108 may include, but are not limited to, a local area network (LAN), a wireless personal area network (WPAN), a wireless local area network (WLAN), a wireless wide area network (WWAN), a cloud network, a long-term evolution (LTE) network, a New Radio (NR) network, a metropolitan area network (MAN), and/or Internet.

The second device 104, for example, a cloud service provider (CSP), may handle most of the computations for generating the decision tree classification result. The first device 102, i.e., the user device, has limited computational and storage resources. Hence, the first device 102 outsources classification tasks associated with inferencing of the decision tree classification model to the second device 104 by leveraging robust and low-latency infrastructure of the communication network 108. The first device 104 cooperates with the CSP for generation of the decision tree classification result. Examples of the first device 102 include, but are not limited to, a smartphone, a desktop, a laptop, a tablet, a smart watch, a smart camera, a home security system, a smart thermostat, a smart lighting system, a fitness tracker, a smart meter, a health monitoring device, a quality control system, and so on.

As mentioned previously, the third device 106, i.e., the model owner, owns a trained decision tree classification model. For obfuscating attributes associated with non-leaf nodes of the decision tree classification model, the third device 106 permutes the decision tree classification model. Permutation of the decision tree classification model prevents attribute leakage once shares of the permuted decision tree classification model are distributed to the first device 102 and the second device 104. To generate the permuted decision tree classification model, the third device 106 defines ($v_b$), which is a matrix indicative of the sequence of attributes, and a permutation matrix (A). Based on a product of (A) and ($v_b$), a matrix indicative of the attribute sequence vector (V) is generated. The attribute sequence vector, i.e., (V), is a permuted sequence of attributes. Based on (V), the third device 106 is configured to permute the decision tree classification model, leading to generation of the permuted decision tree classification model. The permutation changes depth levels of non-leaf nodes of the decision tree classification model in accordance with (V). The permutation leads to obfuscation of the attributes, as the attributes associated with the non-leaf nodes are updated after the permutation.

Thereafter, the third device 106 splits the permuted decision tree classification model to generate a first share of the permuted decision tree classification model and a second share of the permuted decision tree classification model. The splitting causes thresholds associated with non-leaf nodes of the permuted decision tree classification model to be split. For instance, a sum of a first share of a threshold associated with a non-leaf node in the first share of the permuted decision tree classification model and a second share of the threshold associated with a corresponding non-leaf node in the second share of the permuted decision tree classification model is equal to a threshold of the non-leaf node of the permuted decision tree classification model. The splitting also causes labels associated with leaf nodes of the permuted decision tree classification model to be split. For instance, a sum of a first share of a label associated with a leaf node in the first share of the permuted decision tree classification model and a second share of the label associated with a corresponding leaf node in the second share of the permuted decision tree classification model is equal to a label of the leaf node of the permuted decision tree classification model. Hereinafter, for simplicity, the permuted decision tree classification model will be referred to as the permuted decision tree.

The third device 106 transmits a seed to the first device 102. The seed enables the first device 102 to compute first shares of thresholds associated with non-leaf nodes of the first share of the permuted decision tree and first shares of labels associated with leaf nodes of the first share of the permuted decision tree. This allows reducing communication overhead which might otherwise be involved in transmitting the first shares of the thresholds associated with the non-leaf nodes of the first share of the permuted decision tree to the first device 102 and the first shares of the labels associated with the leaf nodes of the first share of the permuted decision tree. The third device 106 further transmits the second share of the permuted decision tree to the second device 104. The transmission includes second shares of the thresholds associated with corresponding non-leaf nodes of the second share of the permuted decision tree, second shares of the labels associated with corresponding leaf nodes of the second share of the permuted decision tree, and attributes associated with the corresponding non-leaf nodes of the second share of the permuted decision tree.

Furthermore, the third device 106 transmits the attribute sequence vector, i.e., (V), to the first device 102. The first device 102 receives the attribute sequence vector (i.e., the permuted sequence of attributes), and, based on (V), permutes an original query data (x). The original query data includes the sequence of attribute values that corresponds to the sequence of attributes ($v_b$). The permutation results in altering of the sequence of attribute values based on (V) (i.e., the product of the permutation matrix (A) and ($v_b$) and, consequently, obtaining of the permuted query data (x'). The alteration involves relocating each attribute value in the original query data in accordance with (V), resulting in transformation from (x) to (x').

The third device 106 further transmits a secret key(S) to the first device 102 and a public key (K) to the second device 104. The secret key(S) is indicative of a first matrix and the public key (K) is indicative of a second matrix. The second matrix, i.e., the public key (K), is a product of the permutation matrix (A) and an inverse of the first matrix (i.e., an inverse of the secret key). The inverse of the first matrix can be represented as ($S^{-1}$). Thus, the public key (K) is a product of (A) and ($S^{-1}$). By transmitting the public key (K), the third device 106 secures (A). The secret key(S) is an invertible matrix. As such, a product of(S) and ($S^{-1}$) results in an identity matrix.

Once the first device 102 receives the seed from the third device 106 and the second device 104 receives the second share of the permuted decision tree from the third device 106, both the first device 102 and the second device iteratively execute the set of steps for traversing the permuted decision tree until a leaf node is encountered. The first device 102 constructs a path from a root node to the leaf node of the first share of the permuted decision tree (not received or stored in the first device 102) using the seed and traverses through the path during the iterative execution of the set of steps. The execution of the set of steps at each iteration leads to a traversal from a non-leaf node at one depth level to another non-leaf node or a leaf node at another depth level. Thus, the execution of the set of steps at each iteration leads to an incremental creation of the path. On the other hand, the second device 104 incrementally traverses through a corresponding path from a root node to a corresponding leaf node of the second share of the permuted decision tree (stored in the second device 104) during each iteration of execution of the set of steps.

At each iteration, the first device 102 selects a mask variable and masks the permuted query data (x') using the mask variable. The masking results in generation of a masked query data (x'') from the permuted query data (x'). Thereafter, the first device 102 encrypts the masked query data (x'') using the secret key(S) to generate an encrypted masked query data (x'''). After the encryption, the first device 102 transmits the encrypted masked query data (x''') to the second device 104. Furthermore, the first device 102 selects a non-leaf node of the first share of the permuted decision tree and masks a first share of a threshold associated with the non-leaf node using the mask variable. If the corresponding iteration is a first iteration, the non-leaf node is a root node of the first share of the permuted decision tree. Thus, the first device 102 masks a first share of a threshold associated with the root node of the first share of the permuted decision tree. Thereafter, the first device 102 transmits, to the second device 104, a masked version of the first share of the threshold associated with the non-leaf node of the first share of the permuted decision tree.

The second device 104, on receiving the encrypted masked query data (x'''), uses the public key (K) to generate a fully permuted query data ($x''^{(A)}$). The second device 104, thereafter, performs a secure comparison operation based on an element of the fully permuted query data ($x''^{(A)}$), the masked version of the first share of the threshold associated with the non-leaf node of the first share of the permuted decision tree (received from the first device 102), and a second share of the threshold associated with a corresponding non-leaf node of the second share of the permuted decision tree. The element is associated with an attribute associated with the non-leaf node of the first share of the permuted decision tree and the corresponding non-leaf node of the second share of the permuted decision tree (stored in the second device 104). At the first iteration, the corresponding non-leaf node of the second share of the permuted decision tree is a root node of the second share of the permuted decision tree. The performance of the secure comparison operation by the second device 104 corresponds to the outsourcing of decision tree inference by the first device 102.

The second device 106 further transmits an outcome of the secure comparison operation to the first device 102. Based on the outcome, the first device 102 selects a first child node of the non-leaf node and the second device 104 selects a second child node of the corresponding non-leaf node. The selections correspond to traversals of through the first share of the permuted decision tree and the second share of the permuted decision tree. At a subsequent iteration, the first child node becomes the non-leaf node of the first share of the permuted decision tree and the second child node is the corresponding non-leaf node of the second share of the permuted decision tree. This indicates that a masked version of a first share of a threshold associated with the first child node and a second share of the threshold associated with second child node is used for the performance of the secure comparison at the subsequent iteration. At the final iteration, however, the first child node is a first leaf node of the first share of the permuted decision tree and the second child node is a corresponding second leaf node of the second share of the permuted decision tree.

When the first leaf node and the corresponding second leaf node are selected after a predefined number of iterations of execution of the set of steps, classification results may be obtained. The predefined number is based on a depth of the permuted decision tree (i.e., the first share of the permuted decision tree and the second share of the permuted decision tree). The first device 102 determines a first share of the classification result based on a label associated with the first leaf node and the second device 104 determines a second share of the classification result based on a label associated with the corresponding second leaf node. The second device 104 further transmits the second share of the classification result to the first device 102. Based on the first share of the classification result and the second share of the classification result, the first device 102 generates a decision tree classification result.

FIG. 1 merely depicts an exemplary networking environment 100, which should not unduly limit the scope of the disclosure. Persons skilled in the art can recognize many variations, alternatives, and modifications of embodiments of the present disclosure.

FIG. 2 is a flowchart 200 that illustrates steps of a method for outsourcing decision tree inference while involving decision tree attribute obfuscation, in accordance with an embodiment of the present disclosure. FIG. 2 is described in conjunction with elements from FIG. 1. With reference to FIG. 2, there is shown the flowchart 200. The flowchart 200 includes steps 202-214. The first device 102 is configured to execute the method for outsourcing inference of a decision tree whose attributes are obfuscated during the inference.

At step 202, the method includes obtaining, by use of the first device 102, a permuted query data from an original query data. The original query data comprises a sequence of attribute values. The sequence of attribute values is altered based on a permutation matrix to generate the permuted query data. At step 204, the method includes receiving, by the first device 102, a secret key indicative of a first matrix from the third device 106. The first matrix is an invertible matrix. The second device 104 receives a public key, indicative of a second matrix, from the third device 106. At step 206, the method includes receiving, by the first device 102, a seed from the third device 106. The seed enables the first device 102 to compute first shares of thresholds associated with non-leaf nodes of a first share of a permuted decision tree. The second device 104, on the other hand, receives, from the third device 106, both second shares of the thresholds and attributes that are associated with corresponding non-leaf nodes of a second share of the permuted decision tree. At step 208, the method includes iteratively executing, by use of the first device 102, a set of steps 208A-208E for traversing the permuted decision tree until a leaf node is encountered.

At step 208A, the method includes selecting, by use of the first device 102, a mask variable to generate a masked query data from the permuted query data, wherein the mask variable is a positive integer. At step 208B, the method includes encrypting, by use of the first device 102, the masked query data based on computation of a product of the first matrix and the masked query data. At step 208C, the method includes transmitting, by the first device 102, the encrypted masked query data to the second device 104. A fully permuted query data is generated by the second device 104 based on the second matrix and the encrypted masked query data. At step 208D, the method includes receiving, by the first device 102, an outcome of a secure comparison operation from the second device 104. The secure comparison operation is performed based on an element of the fully permuted query data, a masked version of a first share of a threshold associated with a non-leaf node of the first share of the permuted decision tree, and a second share of the threshold associated with a corresponding non-leaf node of the second share of the permuted decision tree. At a first iteration, the non-leaf node is a root node of the first share of the permuted decision tree and the corresponding non-leaf node is a root node of the second share of the permuted decision tree. At step 208E, the method includes selecting, by use of the first device 102, a first child node of the non-leaf node. The selection is based on the outcome of the secure comparison operation. The second device 104 selects a second child node of the corresponding non-leaf node based on the outcome of the secure comparison operation. At a subsequent iteration, the first child node is the non-leaf node of the first share of the permuted decision tree and the second child node is the corresponding non-leaf node of the second share of the permuted decision tree. The first child node is a first leaf node of the first share of the permuted decision tree at a final iteration. The second child node is a corresponding second leaf node of the second share of the permuted decision tree at the final iteration.

At step 210, the method includes generating, by use of the first device 102, a first share of a classification result based on a label associated with the first leaf node. At step 212, the method includes receiving, by the first device 102, receiving a second share of the classification result from the second device 104. The second share of the classification result is generated based on a label associated with the corresponding second leaf node stored in the corresponding second leaf node. At step 214, the method includes generating, by use of the first device 102, a decision tree classification result based on the first share of the classification result and the second share of the classification result.

The steps 202-214 are illustrative, and other alternatives can also be provided where one or more steps are added, one or more steps are provided in a different sequence, or one or more steps are eliminated, without departing from the scope of the claims herein.

There is provided a computer program comprising instructions for carrying out all the steps of the method. The computer program is executed on the first device 102 in conjunction with the second device 104 and the third device 106. The computer program is implemented as an algorithm, embedded in a software stored in the non-transitory computer-readable storage medium that has program instructions stored thereon, the program instructions being executable by the one or more processors in the computer system to execute the method illustrated using the flowchart 200. The non-transitory computer-readable storage means may include, but are not limited to, an electronic storage device, a magnetic storage device, an optical storage device, an electromagnetic storage device, a semiconductor storage device, or any suitable combination of the foregoing. Examples of implementation of computer-readable storage medium, but are not limited to, an Electrically Erasable Programmable Read-Only Memory (EEPROM), a Random Access Memory (RAM), a Read Only Memory (ROM), a Hard Disk Drive (HDD), a Flash memory, a Secure Digital (SD) card, a Solid-State Drive (SSD), a computer-readable storage medium, and/or a CPU cache memory.

FIG. 3 illustrates information exchange between entities of the networking environment 100 for outsourcing inferencing of a decision tree classification model and obfuscating attributes of the decision tree classification model during inference, in accordance with an embodiment of the present disclosure. FIG. 3 is described in conjunction with elements from FIG. 1 and FIG. 2. With reference to FIG. 3, there is shown the information exchange between the first device 102, the second device 104, and the third device 106 (the entities of the networking environment 100). The third device 106 defines the matrix ($v_b$) including a sequence of attributes and generates the attribute sequence vector (V) which is a permuted sequence of attributes. The permuted sequence of attributes is a vector that may be obtained based on an outcome of a product of the permutation matrix (A) and the matrix ($v_b$). For example, the sequence of attributes may be [$a_1$, $a_2$, $a_3$], were $a_1$ is a first attribute, $a_2$ is a second attribute, and $a_3$ is a third attribute. Furthermore, the permutation matrix, i.e., (A) may be as follows:

$$A = \begin{bmatrix} A_{11} & A_{12} & A_{13} \\ A_{21} & A_{22} & A_{23} \\ A_{31} & A_{32} & A_{33} \end{bmatrix} = \begin{bmatrix} 0 & 1 & 0 \\ 0 & 0 & 1 \\ 1 & 0 & 0 \end{bmatrix}$$

Thus, the product of A and $v_b$ (i.e., the attribute sequence vector (V)) is [$a_2$, $a_3$, $a_1$]. The third device 106 may obtain a permuted decision tree (M') (i.e., the permuted decision tree classification model) from an original decision tree (M), i.e., an original decision tree classification model. The permutation of the original decision tree leads to obfuscation of attributes associated with nodes of the original decision tree and generation of the permuted decision tree (M'). For instance, a root node of the original decision tree (M) may be associated with the first attribute, first nodes signifying children of the root node may be associated with the second attribute, and second nodes signifying children of the first nodes may be associated with the third attribute. Based on the earlier example of (V), i.e., [$a_2$, $a_3$, $a_1$], the original decision tree (M) is permuted such that a root of the permuted decision tree (M') is associated with the second attribute, first nodes signifying children of the root node is associated with the third attribute, and second nodes signifying children of the first nodes is associated with the first attribute.

The third device 106 may split the permuted decision tree (M') based on additive secret sharing to generate shares of the permuted decision tree. The shares include a first share of the permuted decision tree $[M']_0$ and a second share of the permuted decision tree $[M']_1$. The splitting is such that a threshold associated with each non-leaf node of M' is split into a first share of the threshold and a second share of the threshold. Thus, an accumulation of the first share of the threshold and the second share of the threshold is equal to the threshold associated with the corresponding non-leaf node of M'. In other words, a sum of a threshold associated with a non-leaf node of $[M']_0$ and a threshold associated with a corresponding non-leaf node of $[M']_1$ is equal to the threshold. The splitting is also applicable to a label associated with each leaf node of M'. The label is split into a first share of the label and a second share of the label. Thus, an accumulation of the first share of the label and the second share of the label is equal to the label that is associated with the corresponding leaf node of M'. In other words, a sum of a label associated with a leaf node of $[M']_0$ and a label associated with a corresponding leaf node of $[M']_1$ is equal to the label.

Thereafter, the third device 106 may transmit the attribute sequence vector (V), a seed(s), and the secret key(S) indicative of the first matrix to the first device 102. The third device 106 may further transmit the second share of the permuted decision tree $[M']_1$ and the public key (K) indicative of the second matrix to the second device 104. In an embodiment, the first matrix, i.e., (S), is an invertible matrix. The second matrix, i.e., (K), is a product of the permutation matrix (A) and an inverse of the first matrix ($S^{-1}$). Thus, $K=A*S^{-1}$. The third device 106 selects the first matrix and computes the second matrix prior to their transmissions to the first device 102 and the second device 104, respectively. Each of the permutation matrix (A), the first matrix (S), and the second matrix (K) is a square matrix (such as a 3×3 matrix).

It may be noted that the third device 106 does not transmit the first share of the permuted decision tree $[M']_0$ to the first device 102. Instead, the seed(s), transmitted by the third device 106, allows the first device 102 to construct a path from a root node of $[M]_0$ to a leaf node of $[M]_0$. This reduces transmission overhead and allows preserving memory (which is limited) of the first device 102.

Upon reception of the attribute sequence vector (V), the first device 102 alters a sequence of attribute values constituting the original query data (x) based on the permuted sequence of attributes (i.e., the attribute sequence vector (V)). For example, the original query data constituting the sequence of attribute values is [x(0), x(1), x(2)], wherein x(0) is an attribute value of the first attribute, x(1) is an attribute value of the second attribute, and x(2) is an attribute value of the third attribute. If (V) is [$a_2$, $a_3$, $a_1$], then elements of (x), i.e., x(0), x(1), and x(2), are relocated in accordance with (V). Thus, the sequence of attribute values is altered to obtain a permuted query data (x'). The permuted query data (x') is [x(1), x(2), x(0)].

The first device 102 computes first shares of thresholds associated with non-leaf nodes of the first share of the permuted decision tree $[M]_0$ using the seed(s) received from the third device 106. Specifically, the seed(s) enables the first device 102 to compute a first share of a threshold associated with a root node of $[M]_0$. The computation of a first share of a threshold associated with a non-leaf node (apart from the root node) of the set of non-leaf nodes is computed based on a first share of a threshold associated with a parent non-leaf node. Furthermore, as the third device 106 transmits the second share of the permuted decision tree $[M']_1$ to the second device 104, second shares of the thresholds associated with a set of corresponding non-leaf nodes of the second share of the permuted decision tree $[M]_1$ are received by the second device 104 from the third device 106. The second device 104 receives second shares of thresholds associated with all nodes of the second share of the permuted decision tree $[M]_1$.

Thereafter, both the first device 102 and the second device 104 iteratively execute a set of steps to traverse $[M]_0$ and [M] 1, respectively. Multiple iterations of execution of the set of steps are carried out for obtaining a classification result [c]. The iterations may continue until a leaf node in $[M]_0$ and a corresponding leaf node in $[M]_1$ is reached, i.e., the classification result [c] is obtained. A specific number of iterations of execution of the set of steps that are required to be carried out for obtaining a classification result [c] depends on a depth level of $[M]_0$ and $[M]_1$. Specifically, if the depth level is “n”, where depth level at respective root nodes of $[M]_0$ and $[M]_1$ is “0” and the depth level at respective leaf nodes of $[M]_0$ and $[M]_1$ is “n”, then there would be “n” iterations required to obtain the for obtaining a classification result [c]. In other words, the set of steps will be executed “n” times. For example, of the depth level of $[M]_0$ and $[M]_1$ is “3”, the set of steps will be executed three times leading to a classification result.

The set of steps include selecting a mask variable (I). The mask variable (I) is a positive integer, i.e., I>0. The first device 102 uses the selected mask variable (I) for masking the permuted query data (x'). The selected mask variable (I) is unique at each iteration. The masking results in generation of a masked query data (x") from the permuted query data (x'). The masked query data (x") is different at each iteration, as the selected mask variable is different at each iteration. In an embodiment, the masked query data is generated based on an accumulation of the mask variable (I) with each element of the permuted query data. Thus, if the permuted query data (x') is [x(1), x(2), x(0)], then the masked query data (x") is [x(1)+1, x(2)+1, x(0)+I]. Thereafter, the first device 102 encrypts the masked query data (x") using the secret key(S) indicative of the first matrix. In an embodiment, a product of the first matrix, i.e., (S) and the masked query data (x") is computed to generate an encrypted masked query data (x"). Thus, x'"=S*x". It is to be noted that the masked query data (x") and, consequently, the encrypted masked query data (x'") is different at each iteration. Thereafter, the first device 102 transmits the encrypted masked query data (x'") to the second device 104. This transmission constitutes a step involved in an outsourcing of inference of decision tree model (i.e., the permuted decision tree). The second device 104, upon receiving the encrypted masked query data (x'''), uses the public key (K), indicative of the second matrix, to decrypt the encrypted masked query data (x'''). The decryption involves computation of a product of the second matrix (K) and the encrypted masked query data (x'''). The product represents a fully permuted query data ($x''^{(A)}$). This is because, K*x'''=A*$S^{-1}$*S*x". As $S^{-1}$*S=I (since(S) is invertible), K*x'''=A*x"=$x''^{(A)}$. Thus, the second device 104 generates a fully permuted query data ($x''^{(A)}$) at each iteration as the selected mask variable (I) is different at each iteration. This allows ensuring privacy of the query data (x) or the permuted query data (x").

A number of rows and a number of columns (such as "3") in each of the permutation matrix (A), the first matrix (S), and the second matrix (K) is equal to a number of elements (such as "3") in each of the permuted query data (x'), the masked query data (x"), the encrypted masked query data (x'''), and the fully permuted query data ($x''^{(A)}$). Also, each of the permuted query data (x'), the masked query data (x"), the encrypted masked query data (x'''), and the fully permuted query data ($x''^{(A)}$) is a matrix that includes one column and a number of rows (such as "3") that is equal to the number of elements (such as "3") in each of the permuted query data (x'), the masked query data (x"), the encrypted masked query data (x'''), and the fully permuted query data ($x''^{(A)}$).

The set of steps further include selecting a non-leaf node of $[M]_0$ by the first device 102 and selecting a corresponding non-leaf node of $[M]_1$ by the second device 104. At a first iteration of execution of the set of steps, the non-leaf node of $[M]_0$ is the root node of $[M]_0$ and the corresponding non-leaf node of $[M]_1$ is the root node of $[M]_1$. Thereafter, the second device 104 performs a secure comparison operation for traversing the second share of the permuted decision tree $[M]_1$. For the performance of the secure comparison operation, the second device 104 receives a masked version of a first share of a threshold associated with the non-leaf node (i.e., the root node at the first iteration) of the first share of the permuted decision tree $[M]_0$. The first device 102 may mask the first share of the threshold $[t]_0$ using the selected mask variable (I) to obtain the masked version of the first share of the threshold ($[t]_0$+I) and transmit the masked version of the first share of the threshold ($[t]_0$+I) to the second device 104. Thereafter, the second device 104 performs the secure comparison operation based on an element of the fully permuted query data ($x''^{(A)}$), the masked version of the first share of the threshold ($[t]_0$+I), and a second share of the threshold [t] 1 associated with the corresponding non-leaf node of the second share of the permuted decision tree $[M]_1$. At the first iteration, the element of the fully permuted query data ($x''^{(A)}$) is that which is associated with the root node of $[M]_0$ and the root node of $[M]_1$. The element is (x(1)+I) since the root node of $[M]_0$ and the root node of $[M]_1$ are associated with the second attribute ($a_2$), x(1) is an attribute value of the second attribute ($a_2$), and (x(1)+I) corresponds to x(1) in the fully permuted query data ($x''^{(A)}$). The secure comparison operation involves comparing ($[t]_0$+1+$[t]_1$) with the element of the fully permuted query data ($x''^{(A)}$), (i.e., (x(1)+I) at the first iteration).

The set of steps further include the second device 104 transmitting an outcome of the secure comparison operation to the first device 102. The first device 102 receives the outcome and, based on the outcome, selects a first child node of the non-leaf node (or the root node) of the first share of the permuted decision tree $[M]_0$. The second device 104 selects a second child node of the corresponding non-leaf node (or the root node) of the second share of the permuted decision tree $[M]_1$. At a subsequent iteration (such as a second iteration), the first child node is (i.e., becomes) the non-leaf node of the first share of the permuted decision tree of $[M]_0$ that is selected by the first device 102 and from where the traversal through $[M]_0$ is to be continued. The second child node is (i.e., becomes) the corresponding non-leaf node of the second share of the permuted decision tree $[M]_1$ that is selected by the second device 104 and from where the traversal through $[M]_1$ is to be continued However, at the final iteration, the outcome of the secure comparison operation leads to the selection of the first child node which is a first leaf node of the first share of the permuted decision tree $[M]_0$. Furthermore, the outcome of the secure comparison operation leads to the selection of the second child node which is a corresponding second leaf node of the second share of the permuted decision tree $[M]_1$.

After all iterations of execution of the set of steps are completed, the first device 102 generates a first share of a classification result [c] o. The generation is based on a label associated with the first leaf node. Thus, after the reception of the outcome of the secure comparison at the final iteration, the first leaf node (i.e., the first child node) is selected and the label associated with the first leaf node is determined. Thereafter, $[c]_0$ is generated based on the label. Similarly, the second device 104 generates a second share of a classification result $[c]_1$ based on a label associated with the second leaf node. Thus, based on the outcome of the secure comparison at the final iteration, the corresponding second leaf node (i.e., the second child node) is selected and the label associated with the corresponding second leaf node is determined. Thereafter, [c] 1 is generated based on the label. Thereafter, the second device 104 transmits the second share of a classification result $[c]_1$ to the first device 102. The first device 102 generates a decision tree classification result [c] based on the first share of the classification result $[c]_0$ and the second share of the classification result $[c]_1$.

FIGS. 4A-4C illustrate an exemplary permuted decision tree classification model and its shares, in accordance with an embodiment of the present disclosure. FIGS. 4A, 4B, and 4C are described in conjunction with elements from FIG. 1, FIG. 2, and FIG. 3. With reference to FIG. 4A, there is shown an exemplary permuted decision tree classification model, i.e., a permuted decision tree 400. The permuted decision tree 400 is obtained by permuting an original decision tree (not shown) based on an attribute sequence vector (V). The attribute sequence vector (V) is a product ($A*v_b$). The permuted decision tree 400 is obtained based on an exemplary attribute sequence vector (V) [$a_0$, $a_2$, $a_1$], where attribute ($a_0$) is "Age", attribute ($a_2$) is "Weight", and attribute ($a_1$) is "Blood Pressure". The exemplary attribute sequence vector (V) is obtained based on the product as follows:

$$A^*v_b = \begin{bmatrix} 1 & 0 & 0 \\ 0 & 0 & 1 \\ 0 & 1 & 0 \end{bmatrix} = \begin{bmatrix} a_0 \\ a_1 \\ a_2 \end{bmatrix} = [a_0, a_2, a_1]$$

The root node 402 of the permuted decision tree 400 is associated with "Age", i.e., a first attribute ($a_0$). First nodes of the permuted decision tree 400 that signify children of the root node 402 are associated with "Weight", i.e., a third attribute ($a_2$). Second nodes of the permuted decision tree 400 that signify children of the first nodes are associated with "Blood Pressure", i.e., a second attribute ($a_1$).

In an original query data (x) constituting a sequence of attribute values [x(0), x(1), x(2)], x(0) is an attribute value of the first attribute "Age", x(1) is an attribute value of the second attribute "Blood Pressure", and x(2) is an attribute value of the third attribute "Weight". Thus, (x) is represented as $[x_{(Age)}, x_{(Blood\ Pressure)}, x_{(Weight)}]$. A permuted query data (x') obtained after altering the sequence of attribute values based on the attribute sequence vector (V) is ([x(0), x(2), x(1)]). Thus, the permuted query data (x') is represented as $[x_{(Age)}, x_{(Weight)}, x_{(Blood\ Pressure)}]$.

The third device 106 may split the permuted decision tree 400 into a first share of the permuted decision tree 400A (see FIG. 4B) and a second share of the permuted decision tree 400B (see FIG. 4C). The splitting is such that a threshold associated with each non-leaf node of the permuted decision tree 400 is split into a first share of threshold and a second share of threshold based on additive secret sharing. For example, a threshold (50) associated with a root node 402 of the permuted decision tree 400 is split into a first share of threshold (30) associated with a root node 402A of the first share of the permuted decision tree 400A and a second share of threshold (20) associated with a corresponding root node 402B of the second share of the permuted decision tree 400B. Furthermore, each label associated with each leaf node of the permuted decision tree 400 is split into a first label share and a second label share based on additive secret sharing. Thus, an accumulation of a first label share and a second label share is equal to a label associated with a leaf node of the permuted decision tree 400. For example, a label (0) associated with a leaf node 416 of the permuted decision tree 400 is split into a first label share (54) associated with a leaf node 416A of the first share of the permuted decision tree 400A and a second label share (-54) associated with a corresponding leaf node 416B of the second share of the permuted decision tree 400B.

Both the first device 102 and the second device 104 iteratively execute the set of steps to traverse the first share of the permuted decision tree 400A and the second share of the permuted decision tree 400B, respectively. As a depth level of each of the permuted decision tree 400, the first share of the permuted decision tree 400A, and the second share of the permuted decision tree 400B is "3", three iterations of execution of the set of steps will be required to reach a leaf node of the first share of the permuted decision tree 400A and a corresponding leaf node of the second share of the permuted decision tree 400B. A first share of the classification result is obtained after reaching the leaf node of the first share of the permuted decision tree 400A. A second share of the classification result is obtained after reaching the corresponding leaf node of the second share of the permuted decision tree 400B.

At each iteration, the first device 102 selects a mask variable (I). At a first iteration, (I) is equal to ($I_1$). At a second iteration, (I) is equal to ($I_2$). At a third iteration, (I) is equal to ($I_3$). The mask variable (I) at each iteration masks each element in the permuted query data (x') to obtain a masked query data (x"). At the first iteration, the masked query data (x") is generated by accumulating the mask variable ($I_1$) with each element of the permuted query data (x'). Thus, the masked query data (x") at the first iteration is represented as $[\{x_{(Age)}+I_1\}, \{x_{(Weight)}+I_1\}, \{x_{(Blood\ Pressure)}+I_1\}]$. Similarly, the masked query data (x") at the second iteration is represented as $[\{x_{(Age)}+12\}, \{x_{(Weight)}+12\}, \{x_{(Blood\ Pressure)}+12\}]$. Furthermore, the masked query data (x") at the third iteration is represented as $[\{x_{(Age)}+13\}, \{x_{(Weight)}+13\}, \{x_{(Blood\ Pressure)}+13\}]$.

Thereafter, the first device 102 encrypts the masked query data (x") at each iteration by computing a product of the first matrix (S) and the masked query data (x"). Furthermore, the first device 102 transmits the product (S*x"), i.e., an encrypted masked query data (x'"), to the second device 104 at each iteration. The second device 104, on receiving the encrypted masked query data (x'"), generates a fully permuted query data ($x''^{(A)}$) at each iteration. The generation is based on the second matrix (K) and the encrypted masked query data (S*x") received at each iteration. In an embodiment, the fully permuted query data ($x''^{(A)}$) is generated based on computation of a product of the second matrix (K) and the encrypted masked query data (S*x"). Since K*x'"=A*x" (see FIG. 3), the fully permuted query data ($x''^{(A)}$) is a product of the permutation matrix (A) and the masked query data (x").

Thus, if $$A = \begin{bmatrix} 0 & 1 & 0 \\ 0 & 0 & 1 \\ 1 & 0 & 0 \end{bmatrix}, \text{ then}$$

$$x''^{(A)} = \begin{bmatrix} 1 & 0 & 0 \\ 0 & 0 & 1 \\ 0 & 1 & 0 \end{bmatrix} \begin{bmatrix} x_{(Age)} + I_1 \\ x_{(Weight)} + I_1 \\ x_{(Blood\ Pressure)} + I_1 \end{bmatrix} = [x_{(Age)} + I_1,\ x_{(Blood\ Pressure)} + I_1,\ x_{(Weight)} + I_1]$$

at the first iteration. Similarly, $x''^{(A)}=[x_{(Age)}+I_2, x_{(Blood\ Pressure)}+I_2, x_{(Weight)}+I_2]$ at the second iteration and $x''^{(A)}=[x_{(Age)}+I_3, x_{(Blood\ Pressure)}+I_3, x_{(Weight)}+I_3]$ at the third iteration.

At each iteration, the first device 102 selects a non-leaf node of the first share of the permuted decision tree 400A and the second device 104 selects a corresponding non-leaf node of the second share of the permuted decision tree 400B. Thereafter, the first device 102 computes a first share of a threshold associated with the selected non-leaf node of the first share of a permuted decision tree 400A. The second device 102 retrieves a second share of the threshold associated with the selected corresponding non-leaf node of the second share of the permuted decision tree 400B. The first device 102 further generates a masked version of the first share of the threshold associated with the selected non-leaf node of the first share of the permuted decision tree 400A based on an accumulation of the mask variable selected at a corresponding iteration and the first share of the threshold associated with the selected corresponding non-leaf node. The first device 102 further transmits, to the second device 104, the masked version of the first share of the threshold associated with the selected non-leaf node of the first share of the permuted decision tree 400A.

At each iteration, the second device 104 performs a secure comparison operation based on an element of the fully permuted query data, the (received) masked version of the first share of the threshold associated with the selected non-leaf node of the first share of the permuted decision tree 400A, and the (retrieved) second share of the threshold associated with the selected corresponding non-leaf node of the second share of the permuted decision tree 400B. Thus, the transmission of the masked version of the first share of the threshold associated with the selected non-leaf node of the first share of the permuted decision tree 400A (by the first device 102) enables the second device 104 to perform the secure comparison operation. The element of the fully permuted query data, used for the performance of the secure comparison operation, is associated with an attribute stored in the selected corresponding non-leaf node of the second share of the permuted decision tree 400B. The secure comparison operation is performed by comparing the element of the fully permuted query data and an accumulation of the masked version of the first share of the threshold associated with the selected non-leaf node of the first share of the permuted decision tree 400A and the second share of the threshold associated with the selected corresponding non-leaf node of the second share of the permuted decision tree 400B. The second device 104 transmits an outcome of the secure comparison operation to the first device 102. Based on the outcome, the first device 102 selects a first child node of the non-leaf node of the first share of the permuted decision tree 400A and the second device 104 selects a second child node of the corresponding non-leaf node of the second share of the permuted decision tree 400B.

At a subsequent iteration, the selected first child node is the selected non-leaf node of the first share of the permuted decision tree 400A and the selected second child node is the selected corresponding non-leaf node of the second share of the permuted decision tree 400B. However, at a final iteration, the selected first child node is a first leaf node of the first share of the permuted decision tree 400A and the selected second child node is a corresponding second leaf node of the second share of the permuted decision tree 400B. Based on labels associated with the first leaf node and the corresponding second leaf node, shares of a classification result may be determined. Specifically, the first device 102 determines a first share of the classification result based on the label associated with the first leaf node and the second device 104 determines a second share of the classification result based on the label associated with the corresponding second leaf node.

At a first iteration, the selected non-leaf node is the root node 402A of the first share of the permuted decision tree 400A and the selected corresponding non-leaf node is the root node 402B of the second share of the permuted decision tree 400B. Thereafter, the first device 102 computes a first share of a threshold associated with the root node 402A of the first share of the permuted decision tree 400A by applying a pseudo-random generator (PRNG) on the seed(s) received from the third device 106 (see FIG. 3). The outcome of the PRNG application is the first share of the threshold associated with the root node 402A (i.e., 30). It may be noted that the first device 102 is required to compute the first share of the threshold (30) associated with the root node 402A since the third device 106 does not transmit the first share of the permuted decision tree 400A to the first device 102. On the other hand, a second share of the threshold (20) associated with the root node 402B of the second share of the permuted decision tree 400B is stored in the second device 104. This is because the third device 106 transmits the second share of the permuted decision tree 400B to the second device 104.

The first device 102 selects the mask variable $I_1$ at the first iteration. Thereafter, the first device 102 masks the first share of the threshold (30) associated with the root node 402A of the first share of the permuted decision tree 400A to generate a masked version of the first share of the threshold $(30+I_1)$. The first device 102 transmits the masked version of the first share of the threshold $(30+I_1)$ to the second device 104. The second device 104 performs a secure comparison operation based on an element of the fully permuted query data associated with an attribute stored in the root node 402B of the second share of the permuted decision tree 400B. The element is $(x_{(Age)}+I_1)$ as the first attribute "Age" is stored in the corresponding non-leaf node, i.e., the root node 402B of the second share of the permuted decision tree 400B. The secure comparison operation is performed further based on the masked version of the first share of the threshold $(30+I_1)$ associated with the root node 402A of the first share of the permuted decision tree 400A and the second share of the threshold (20) associated with the root node 402B of the second share of the permuted decision tree 400B. The secure comparison operation is performed by comparing $(x_{(Age)}+I_1)$ with an accumulation of the masked version of the first share of the threshold $(30+I_1)$ and the second share of the threshold (20), i.e., $(50+I_1)$. The second device 104 transmits an outcome of the secure comparison operation to the first device 102. Based on the outcome, the first device 102 selects a non-leaf node 406A, which is a first child node of the root node 402A of the first share of the permuted decision tree 400A and the second device 104 selects a corresponding non-leaf node 406B, which is second child node of the root node 402B of the second share of the permuted decision tree 400B.

At a second iteration, the selected non-leaf node is the first child node of the root node 402A of the first share of the permuted decision tree 400A (or the non-leaf node 406A) and the selected corresponding non-leaf node is the second child node of the root node 402B of the second share of the permuted decision tree 400B (or the corresponding non-leaf node 406B). The selections are based on the outcome of the secure comparison operation obtained at the first iteration. Thereafter, the first device 102 computes a first share of a threshold associated with the first child node by applying the PRNG on a portion of the first share of the threshold associated with the root node 402A of the first share of the permuted decision tree 400A. The outcome of the PRNG application is the first share of the threshold associated with the non-leaf node 406A (i.e., 42). The portion of the first share of the threshold (30) associated with the root node 402A is selected based on the outcome of the secure comparison operation obtained at the first iteration (involving selection of the first child node). The first share of the threshold (30) associated with the root node 402A can be represented as (011110) in binary. The selection of the non-leaf node 406A leads to the selection of the portion (110). By applying the PRNG on the portion (110), the first share of the threshold associated with the non-leaf node 406A (i.e., 42) is obtained. On the other hand, a second share of the threshold (33) associated with the second child node of the root node 402B of the second share of the permuted decision tree 400B (i.e., the corresponding non-leaf node 406B) is stored in the second device 104. This is because the third device 106 transmits the second share of the permuted decision tree 400B to the second device 104.

The first device 102 selects the mask variable 12 at the second iteration. Thereafter, the first device 102 masks the first share of the threshold (42) associated with the non-leaf node 406A of the first share of the permuted decision tree 400A to generate a masked version of the first share of the threshold $(42+I_2)$. The first device 102 transmits the masked version of the first share of the threshold $(42+I_2)$ to the second device 104. The second device 104 performs a secure comparison operation based on an element of the fully permuted query data associated with an attribute stored in the corresponding non-leaf node 406B of the second share of the permuted decision tree 400B. The element is $(x_{(Weight)}+I_2)$ as the third attribute "Weight" is stored in the corresponding non-leaf node 406B of the second share of the permuted decision tree 400B. The secure comparison operation is performed further based on the masked version of the first share of the threshold $(42+I_2)$ associated with the non-leaf node 406A of the first share of the permuted decision tree 400A and the second share of the threshold (33) associated with the corresponding non-leaf node 406B of the second share of the permuted decision tree 400B. The secure comparison operation is performed by comparing ($x_{(Weight)}$+ $I_2$) with an accumulation of the masked version of the first share of the threshold (42+$I_2$) and the second share of the threshold (33), i.e., (75+$I_2$). The second device 104 transmits an outcome of the secure comparison operation to the first device 102. Based on the outcome, the first device 102 selects a non-leaf node 414A, which is a first child node of the non-leaf node 406A of the first share of the permuted decision tree 400A and the second device 104 selects a corresponding non-leaf node 414B, which is second child node of the corresponding non-leaf node 406B of the second share of the permuted decision tree 400B.

At a third iteration, the selected non-leaf node is the first child node of the non-leaf node 406A of the first share of the permuted decision tree 400A (or the non-leaf node 414A) and the selected corresponding non-leaf node is the second child node of the corresponding non-leaf node 406B of the second share of the permuted decision tree 400B (or the corresponding non-leaf node 414B). The selections are based on the outcome of the secure comparison operation obtained at the second iteration. Thereafter, the first device 102 computes a first share of a threshold associated with the non-leaf node 414A of the first share of the permuted decision tree 400A by applying the PRNG on a portion of a first share of the threshold associated with a parent node of the non-leaf node 414A of the first share of the permuted decision tree 400A. The parent node of the non-leaf node 414A is the non-leaf node 406A. The outcome of the PRNG application is the first share of the threshold associated with the non-leaf node 414A (i.e., 25). The portion of the first share of the threshold (42) associated with the parent node of the non-leaf node 414A, i.e., the non-leaf node 406A, is selected based on the outcome of the secure comparison operation obtained at a pre-final iteration (i.e., the second iteration as the total number of iterations is “3”) involving selection of the non-leaf node 414A. The first share of the threshold (42) associated with the non-leaf node 406A can be represented as (101010) in binary. The selection of the non-leaf node 414A leads to the selection of the portion (010). By applying the PRNG on the portion (010), the first share of the threshold associated with the non-leaf node 414A (i.e., 25) is obtained. On the other hand, a second share of the threshold (100) associated with the corresponding non-leaf node 414B of the second share of the permuted decision tree 400B (i.e., the second child node of the corresponding non-leaf node 406B of the second share of the permuted decision tree 400B) is stored in the second device 104. This is because the third device 106 transmits the second share of the permuted decision tree 400B to the second device 104.

The first device 102 selects the mask variable 13 at the third iteration. Thereafter, the first device 102 masks the first share of the threshold (25) associated with the non-leaf node 414A of the first share of the permuted decision tree 400A to generate a masked version of the first share of the threshold (25+$I_3$). The first device 102 transmits the masked version of the first share of the threshold (25+$I_3$) to the second device 104. The second device 104 performs a secure comparison operation based on an element of the fully permuted query data associated with an attribute stored in the corresponding non-leaf node 414B of the second share of the permuted decision tree 400B. The element is ($x_{(Blood\ Pressure)}$+$I_3$) as the second attribute “Blood Pressure” is stored in the corresponding non-leaf node 414B of the second share of the permuted decision tree 400B. The secure comparison operation is performed further based on the masked version of the first share of the threshold (25+$I_3$) associated with the non-leaf node 414A of the first share of the permuted decision tree 400A and the second share of the threshold (100) associated with the corresponding non-leaf node 414B of the second share of the permuted decision tree 400B. The secure comparison operation is performed by comparing ($x_{(Blood\ Pressure)}$+$I_3$) with an accumulation of the masked version of the first share of the threshold (25+$I_3$) and the second share of the threshold (100), i.e., (125+$I_3$). The second device 104 transmits an outcome of the secure comparison operation to the first device 102. Based on the outcome, the first device 102 selects a first leaf node 430A, which is a first child node of the non-leaf node 414A of the first share of the permuted decision tree 400A and the second device 104 selects a corresponding second leaf node 430B, which is second child node of the corresponding non-leaf node 414B of the second share of the permuted decision tree 400B.

At this stage, the iterative execution of the set of steps is completed. The first device 102 computes a label associated with the first leaf node 430A by applying the PRNG on a portion of the first share of the threshold associated with a non-leaf node (such as the non-leaf node 414A) of the first share of the permuted decision tree 400A. The non-leaf node 414A is a parent node of the first leaf node 430A. The first share of the threshold associated with the non-leaf node 414A is (25). The first share of the threshold (25) associated with the non-leaf node 414A can be represented as (011001) in binary. The selection of the first leaf node 430A leads to the selection of the portion (001) of the first share of the threshold (011001). In other words, the portion (001) of the first share of the threshold (25 or 011001) associated with the parent node (i.e., the non-leaf node 414A) of the first leaf node 430A is selected based on an outcome of the secure comparison operation obtained at the final iteration involving selection of the first leaf node 414A. By applying the PRNG on the portion (001), the label associated with the first leaf node 430A (i.e., 27) is obtained.

Based on the label associated with the first leaf node 430A, the first device 102 generates a first share of a classification result. The second device 104 generates a second share of the classification result based on a label (-26) associated with the corresponding second leaf node 430B. The label (-26) is stored in the corresponding second leaf node 430B. Thereafter, the second device 104 transmits second share of the classification result to the first device 102. Upon reception of the second share of the classification result from the second device 104, the first device 102 generates a decision tree classification result (1) based on the first share of the classification result (27) and the second share of the classification result (-26).

FIGS. 5A-5C are block diagrams illustrating components of the entities in the exemplary networking environment 100, in accordance with an embodiment of the present disclosure. FIGS. 5A-5C are described in conjunction with elements from FIG. 1, FIG. 2, FIG. 3, and FIGS. 4A-4C. With reference to FIG. 5A, there is shown the first device 102. The first device 102 includes a first processor 502A, a first memory 504A, and a first network interface 506A. The first memory 504A stores the original query data (x), the attribute sequence vector (V) (received from the third device 106), the permuted query data (x'), the first matrix (S) (received from the third device 106), the seed(s) (received from the third device 106), the mask variable selected at each iteration, the masked query data generated at each iteration, the encrypted masked query data generated at each iteration, the first shares of thresholds associated with the non-leaf nodes of a first share of the permuted decision tree, masked versions of the first shares of thresholds, outcomes of the secure comparison operations (received from the second device 104), the first share of the classification result, the second share of the classification result (received from the second device 104), and the decision tree classification result.

In an embodiment, the first processor 502A is configured to perform a set of operations that enable generation of the first share of the classification result, the second share of a classification result, and the decision tree classification result.

The first processor 502A refers to a computational element that is operable to respond to and processes instructions that drive the first device 102. The first processor 502A may refer to one or more individual processors, processing devices, and various elements associated with a processing device that may be shared by other processing devices. Additionally, the one or more individual processors, the processing devices, and the various elements are arranged in various architectures for responding to and processing the instructions that drive the first device 102. In some implementations, the first processor 502A may be an independent unit.

Examples of the first processor 502A may include, but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and control circuitry.

The first memory 504A refers to a volatile or persistent medium, such as an electrical circuit, a magnetic disk, a virtual memory, or an optical disk, in which a computer stores data or software for any duration. Optionally, the first memory 504A is a non-volatile mass storage, such as a physical storage media. Examples of implementation of the first memory 504A may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The first network interface 506A refers to a communication interface to enable the first device 102 to communicate with the second device 104 and the third device 106. Examples of the first network interface 506A include, but are not limited to, a network interface card, a transceiver, and the like.

With reference to FIG. 5B, there is shown the second device 104. The second device 104 includes a second processor 502B, a second memory 504B, and a second network interface 506B. The second memory 504B stores the second matrix (received from the third device 106), the second share of the permuted decision tree (received from the third device 106), the encrypted masked query data generated at each iteration (received from the first device 102), the fully permuted query data generated at each iteration (received from the first device 102), the masked versions of the first shares of the thresholds associated with the non-leaf nodes of the first share of the permuted decision tree (received from the first device 102), the second shares of the thresholds associated with the set of corresponding non-leaf nodes of the second share of the permuted decision tree (received from the third device 106), attributes associated with the non-leaf nodes of the second share of the permuted decision tree (received from the third device 106), labels associated with leaf nodes of the second share of the permuted decision tree (received from the third device 106), outcomes of the secure comparison operations, and the second share of the classification result.

In an embodiment, the second processor 502B is configured to perform a set of operations that enable the generation of the first share of the classification result, the second share of a classification result, and the decision tree classification result.

The second processor 502B refers to a computational element that is operable to respond to and processes instructions that drive the second device 104. The second processor 502B may refer to one or more individual processors, processing devices, and various elements associated with a processing device that may be shared by other processing devices. Additionally, the one or more individual processors, the processing devices, and the various elements are arranged in various architectures for responding to and processing the instructions that drive the second device 104. In some implementations, the second processor 502B may be an independent unit.

Examples of the second processor 502B may include, but are not limited to, a hardware processor, a digital signal processor (DSP), a microprocessor, a microcontroller, a complex instruction set computing (CISC) processor, a state machine, an application-specific integrated circuit (ASIC) processor, a very long instruction word (VLIW) processor, a reduced instruction set (RISC) processor, a data processing unit, a graphics processing unit (GPU), and other processors or control circuitry.

The second memory 504B refers to a volatile or persistent medium, such as an electrical circuit, a magnetic disk, a virtual memory, or an optical disk, in which a computer can store data or software for any duration. Optionally, the second memory 504B is a non-volatile mass storage, such as a physical storage media. Examples of implementation of the second memory 504B include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The second network interface 506B refers to a communication interface to enable the second device 104 to communicate with the first device 102 and the third device 106. Examples of the second network interface 506B include, but are not limited to, a network interface card, a transceiver, and the like.

With reference to FIG. 5C, there is shown the third device 106. The third device 106 includes a third processor 502C, a third memory 504C, and a third network interface 506C. The third memory 504C stores the attribute sequence vector, the first matrix, the second matrix, the original decision tree, the permuted decision tree, the first share of the permuted decision tree, the second share of the permuted decision tree, the seed, the second shares of the thresholds associated with the set of corresponding non-leaf nodes of the second share of the permuted decision tree, the attributes associated with the non-leaf nodes of the second share of the permuted decision tree, and labels associated with the leaf nodes of the second share of the permuted decision tree.

In an embodiment, the third processor 502C is configured to perform a set of operations that enable the generation of the first share of the classification result, the second share of a classification result, and the decision tree classification result.

The third processor 502C refers to a computational element that is operable to respond to and processes instructions that drive the third device 106. The third processor 502C may refer to one or more individual processors, processing devices, and various elements associated with a processing device that may be shared by other processing devices. Additionally, the one or more individual processors, the processing devices, and the various elements are arranged in various architectures for responding to and processing the instructions that drive the third device 106. In some implementations, the third processor 502C may be an independent unit.

Examples of the third processor 502C may include, but are not limited to, a hardware processor, a digital signal processor (DSP), a microprocessor, a microcontroller, a complex instruction set computing (CISC) processor, a state machine, an application-specific integrated circuit (ASIC) processor, a very long instruction word (VLIW) processor, a reduced instruction set (RISC) processor, a data processing unit, a graphics processing unit (GPU), and other processors or control circuitry.

The third memory 504C refers to a volatile or persistent medium, such as an electrical circuit, a magnetic disk, a virtual memory, or an optical disk, in which a computer can store data or software for any duration. Optionally, the third memory 504C is a non-volatile mass storage, such as a physical storage media. Examples of implementation of the third memory 504C include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The third network interface 506C refers to a communication interface to enable the third device 106 to communicate with the first device 102 and the second device 104. Examples of the third network interface 506C include, but are not limited to, a network interface card, a transceiver, and the like.

Modifications to embodiments of the present disclosure described in the foregoing are possible without departing from the scope of the present disclosure as defined by the accompanying claims. Expressions such as "including", "comprising", "incorporating", "have", "is", etc., used to describe and claim the present disclosure are intended to be construed in a non-exclusive manner, namely allowing for items, components or elements not explicitly described also to be present. Reference to the singular is also to be construed to relate to the plural. The word (exemplary (is used herein to mean (serving as an example, instance or illustration (. Any embodiment described as (exemplary (is not necessarily to be construed as preferred or advantageous over other embodiments and/or to exclude the incorporation of features from other embodiments. The word (optionally (is used herein to mean (is provided in some embodiments and not provided in other embodiments). It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A first device comprising a first processor, the first processor configured to:

obtain a permuted query data from an original query data comprising a sequence of attribute values, wherein the sequence of attribute values is altered based on a permutation matrix to obtain the permuted query data;

receive a secret key indicative of a first matrix from a third device, wherein the first matrix is an invertible matrix, and wherein a second device receives a public key, indicative of a second matrix, from the third device;

receive a seed from the third device that enables computation of first shares of thresholds associated with non-leaf nodes of a first share of a permuted decision tree, wherein second shares of the thresholds and attributes associated with corresponding non-leaf nodes of a second share of the permuted decision tree are received by the second device from the third device;

execute, iteratively, a set of steps for traversing the permuted decision tree until a leaf node is encountered, wherein the set of steps comprises:

select a mask variable to generate a masked query data from the permuted query data, wherein the mask variable is a positive integer, encrypt the masked query data based on computation of a product of the first matrix and the masked query data, transmit the encrypted masked query data to the second device, wherein a fully permuted query data is generated by the second device based on the second matrix and the encrypted masked query data, receive, from the second device, an outcome of a secure comparison operation performed based on an element of the fully permuted query data, a masked version of a first share of a threshold associated with a non-leaf node of the first share of the permuted decision tree, and a second share of the threshold associated with a corresponding non-leaf node of the second share of the permuted decision tree, wherein, at a first iteration, the non-leaf node is a root node of the first share of the permuted decision tree and the corresponding non-leaf node is a root node of the second share of the permuted decision tree, and select a first child node of the non-leaf node based on the outcome of the secure comparison operation, wherein a second child node of the corresponding non-leaf node is selected based on the outcome of the secure comparison operation, wherein, at a subsequent iteration, the first child node is the non-leaf node of the first share of the permuted decision tree and the second child node is the corresponding non-leaf node of the second share of the permuted decision tree, wherein the first child node is a first leaf node of the first share of the permuted decision tree at a final iteration, and wherein the second child node is a corresponding second leaf node of the second share of the permuted decision tree at the final iteration;

generate a first share of a classification result based on a label associated with the first leaf node;

receive, from the second device, a second share of the classification result generated based on a label associated with the corresponding second leaf node stored in the corresponding second leaf node; and generate a decision tree classification result based on the first share of the classification result and the second share of the classification result.

2. The first device according to claim 1, wherein the first processor is further configured to:

receive an attribute sequence vector from the third device, wherein the attribute sequence vector is a permuted sequence of attributes, wherein the attribute sequence vector is an outcome of a product of the permutation matrix and a matrix including a sequence of attributes; and alter the sequence of attribute values constituting the original query data based on the permuted sequence of attributes, wherein the permuted query data is obtained based on the alteration.

3. The first device according to claim 1, wherein the second matrix is a product of the permutation matrix and an inverse of the first matrix.

4. The first device according to claim 1, wherein each of the permutation matrix, the first matrix, and the second matrix is a square matrix, wherein a number of rows and a number of columns in each of the permutation matrix, the first matrix, and the second matrix is equal to a number of elements in each of the permuted query data, the masked query data, the encrypted masked query data, and the fully permuted query data, and wherein each of the permuted query data, the masked query data, the encrypted masked query data, and the fully permuted query data is a matrix that includes one column and a number of rows that is equal to the number of elements in each of the permuted query data, the masked query data, the encrypted masked query data, and the fully permuted query data.

5. The first device according to claim 1, wherein the masked query data is generated based on an accumulation of the mask variable with each element of the permuted query data.

6. The first device according to claim 1, wherein the fully permuted query data is generated based on computation of a product of the second matrix and the encrypted masked query data.

7. The first device according to claim 1, wherein the first processor is further configured to compute a first share of the threshold associated with the root node of the first share of the permuted decision tree by applying a pseudo-random generator (PRNG) on the seed, wherein a second share of the threshold associated with the root node of the second share of the permuted decision tree is stored in the second device.

8. The first device according to claim 7, wherein the first processor is further configured to compute a first share of a threshold associated with the first child node by applying the PRNG on a portion of the first share of the threshold associated with the root node of the first share of the permuted decision tree, wherein the first child node is a child of the root node of the first share of the permuted decision tree, and wherein the portion of the first share of the threshold associated with the root node is selected based on the outcome of the secure comparison operation obtained at the first iteration involving selection of the first child node, wherein a second share of the threshold associated with the second child node is stored in the second device, wherein the second child node is a child of the root node of the second share of the permuted decision tree, and wherein the second child node is selected based on the outcome of the secure comparison operation obtained at the first iteration.

9. The first device according to claim 1, wherein the first processor is further configured to compute the first share of the threshold associated with the non-leaf node of the first share of the permuted decision tree by applying a PRNG on a portion of a first share of a threshold associated with a parent node of the non-leaf node of the first share of the permuted decision tree, wherein the non-leaf node is a parent of the first leaf node, and wherein the portion of the first share of the threshold associated with the parent node of the non-leaf node is selected based on an outcome of the secure comparison operation at a pre-final iteration involving selection of the parent of the non-leaf node, wherein a second share of the threshold associated with the corresponding non-leaf node of the second share of the permuted decision tree is stored in the second device, wherein the corresponding non-leaf node is a parent node of the corresponding second leaf node, and wherein the parent node of the corresponding second leaf node is selected based on the outcome of the secure comparison operation obtained at the pre-final iteration.

10. The first device according to claim 1, wherein the first processor is further configured to compute the label associated with the first leaf node by applying a PRNG on a portion of the first share of a threshold associated with a non-leaf node of the first share of the permuted decision tree, wherein the non-leaf node is a parent node of the first leaf node, and wherein the portion of the first share of the threshold associated with the parent node of the first leaf node is selected based on an outcome of the secure comparison operation obtained at the final iteration involving selection of the first leaf node.

11. The first device according to claim 1, wherein the element of the fully permuted query data, used for the performance of the secure comparison operation, is associated with an attribute stored in the corresponding non-leaf node, wherein an element used for the performance of the secure comparison operation at each iteration is different.

12. The first device according to claim 11, wherein the first processor is further configured to:

generate a masked version of the first share of the threshold associated with the non-leaf node of the first share of the permuted decision tree based on an accumulation of the selected mask variable and the first share of the threshold associated with the corresponding non-leaf node; and transmit, to the second device, the masked version of the first share of the threshold associated with the non-leaf node of the first share of the permuted decision tree for enabling the second device to perform the secure comparison operation, wherein an accumulation of the masked version of the first share of the threshold associated with the non-leaf node of the first share of the permuted decision tree and the second share of the threshold associated with the corresponding non-leaf node of the second share of the permuted decision tree is compared with the element of the fully permuted query data during the secure comparison operation.

13. A second device comprising a second processor, the second processor configured to:

receive, from a third device, a public key indicative of a second matrix, wherein a first device receives a secret key indicative of a first matrix from the third device;

receive second shares of the thresholds and attributes associated with corresponding non-leaf nodes of a second share of a permuted decision tree from the third device, wherein the first device computes first shares of thresholds associated with non-leaf nodes of a first share of the permuted decision tree using a seed received from the third device;

execute, iteratively, a set of steps for traversing the permuted decision tree until a leaf node is encountered, wherein the set of steps comprises:

receive an encrypted masked query data from the first device, wherein a masked query data is encrypted by the first device to generate the encrypted masked query data, wherein the first device generates the masked query data from a permuted query data using a mask variable selected by the first device, wherein the mask variable is a positive integer, wherein the masked query data is generated based on an accumulation of the mask variable with each element of the permuted query data, wherein the first device generates the permuted query data from an original query data comprising a sequence of attribute values, and wherein the sequence of attribute values is altered based on a permutation matrix to generate the permuted query data, generate a fully permuted query data based on the second matrix and the encrypted masked query data, wherein the fully permuted query data is generated based on computation of a product of the second matrix and the encrypted masked query data, receive, from the first device, a masked version of a first share of a threshold associated with a non-leaf node of the first share of the permuted decision tree, wherein the masked version of a first share of a threshold associated with the non-leaf node is generated based on an accumulation of the selected mask variable and the first share of the threshold associated with the corresponding non-leaf node, perform a secure comparison operation based on an element of the fully permuted query data, the masked version of the first share of the threshold associated with a non-leaf node of the first share of the permuted decision tree, and a second share of the threshold associated with a corresponding non-leaf node of the second share of the permuted decision tree, wherein the non-leaf node is a root node of the first share of the permuted decision tree and the corresponding non-leaf node is a root node of the second share of the permuted decision tree at a first iteration, select a second child node of the corresponding non-leaf node based on the outcome of the secure comparison operation, wherein the second child node is the corresponding non-leaf node of the second share of the permuted decision tree at a subsequent iteration, and wherein the second child node is a corresponding second leaf node of the second share of the permuted decision tree at a final iteration, and transmit the outcome of the secure comparison operation to the first device, wherein the first device selects a first child node of the non-leaf node based on the outcome of the secure comparison operation, wherein the first child node is the non-leaf node of the first share of the permuted decision tree at the subsequent iteration, and wherein the first child node is a first leaf node of the first share of the permuted decision tree at the final iteration; and transmit, to the first device, a second share of the classification result generated based on a label associated with the corresponding second leaf node, wherein the first device generates a first share of a classification result based on a label associated with the first leaf node, and wherein the first device generates a decision tree classification result based on the first share of the classification result and the second share of the classification result.

14. The second device according to claim 13, wherein the second matrix is a product of the permutation matrix and an inverse of the first matrix.

15. The second device according to claim 13, wherein the element of the fully permuted query data used for the performance of the secure comparison operation is associated with an attribute stored in the corresponding non-leaf node, wherein an element used for the performance of the secure comparison operation at each iteration is different, and wherein a count of iterations of execution of the set of steps is equal to a number of elements in the fully permuted query data.

16. The second device according to claim 13, wherein the performance of the secure comparison operation involves comparing an accumulation of the masked version of the first share of the threshold associated with the non-leaf node of the first share of the permuted decision tree and the second share of the threshold associated with the corresponding non-leaf node of the second share of the permuted decision tree with the element of the fully permuted query data.

17. A method comprising:

obtaining a permuted query data from an original query data comprising a sequence of attribute values, wherein the sequence of attribute values is altered based on a permutation matrix to obtain the permuted query data;

receiving a secret key indicative of a first matrix from a third device, wherein the first matrix is an invertible matrix, and wherein a second device receives a public key, indicative of a second matrix, from the third device;

receiving a seed from the third device that enables computation of first shares of thresholds associated with non-leaf nodes of a first share of a permuted decision tree, wherein second shares of the thresholds and attributes associated with corresponding non-leaf nodes of a second share of the permuted decision tree are received by the second device from the third device;

executing, iteratively, a set of steps for traversing the permuted decision tree until a leaf node is encountered, wherein the set of steps comprises:

selecting a mask variable to generate a masked query data from the permuted query data, wherein the mask variable is a positive integer, encrypting the masked query data based on computation of a product of the first matrix and the masked query data, transmitting the encrypted masked query data to the second device, wherein a fully permuted query data is generated by the second device based on the second matrix and the encrypted masked query data, receiving, from the second device, an outcome of a secure comparison operation performed based on an element of the fully permuted query data, a masked version of a first share of a threshold associated with a non-leaf node of the first share of the permuted decision tree, and a second share of the threshold associated with a corresponding non-leaf node of the second share of the permuted decision tree, wherein, at a first iteration, the non-leaf node is a root node of the first share of the permuted decision tree and the corresponding non-leaf node is a root node of the second share of the permuted decision tree, and selecting a first child node of the non-leaf node based on the outcome of the secure comparison operation, wherein a second child node of the corresponding non-leaf node is selected based on the outcome of the secure comparison operation, wherein, at a subsequent iteration, the first child node is the non-leaf node of the first share of the permuted decision tree and the second child node is the corresponding non-leaf node of the second share of the permuted decision tree, wherein the first child node is a first leaf node of the first share of the permuted decision tree at a final iteration, and wherein the second child node is a corresponding second leaf node of the second share of the permuted decision tree at the final iteration;

generating a first share of a classification result based on a label associated with the first leaf node;

receiving, from the second device, a second share of the classification result generated based on a label associated with the corresponding second leaf node stored in the corresponding second leaf node; and generating a decision tree classification result based on the first share of the classification result and the second share of the classification result.

18. A system comprising:

a first device comprising a first processor;

a second device comprising a second processor; and a third device comprising a third processor, the third processor configured to:

transmit an attribute sequence vector to the first device to enable the first device to generate a permuted query data, transmit a secret key indicative of a first matrix to the first device, transmit a public key indicative of a second matrix to the second device, obtain a permuted decision tree, wherein each non-leaf node of the permuted decision tree includes an attribute and a threshold, split the permuted decision tree into a first share of the permuted decision tree and a second share of the permuted decision tree, transmit a seed to the first device to enable the first device to compute first shares of thresholds associated with non-leaf nodes of a first share of the permuted decision tree and first shares of labels associated with leaf nodes of the first share of the permuted decision tree, and transmit, to the second device, the second share of the permuted decision tree including second shares of the thresholds associated with corresponding non-leaf nodes of the second share of the permuted decision tree, second shares of labels associated with corresponding leaf nodes of the first share of the permuted decision tree, and attributes associated with the corresponding non-leaf nodes of the second share of the permuted decision tree.

* * * * *